US010816432B2

(12) United States Patent
 Tinaphong et al.

(10) Patent No.: US 10,816,432 B2
(45) Date of Patent: Oct. 27, 2020

(54) SYSTEM HAVING A WATER OR GAS LEAK DETECTION CIRCUIT AND AUTOMATIC VALVE CLOSURE MECHANISM CONTROLLED THEREBY

(71) Applicant: VOXX International Corporation, Hauppauge, NY (US)

(72) Inventors: Prapan Paul Tinaphong, Carmel, IN (US); Yiqi W. Woodling, Carmel, IN (US)

(73) Assignee: VOXX International Corporation, Hauppauge, NY (US)

( * ) Notice: Subject to any disclaimer, the term of this patent is extended or adjusted under 35 U.S.C. 154(b) by 0 days.

(21) Appl. No.: 16/140,741

(22) Filed: Sep. 25, 2018

(65) Prior Publication Data
 US 2019/0094099 A1    Mar. 28, 2019

Related U.S. Application Data

(60) Provisional application No. 62/564,539, filed on Sep. 28, 2017.

(51) Int. Cl.
 *G01M 3/18* (2006.01)
 *G08B 21/20* (2006.01)
 (Continued)

(52) U.S. Cl.
 CPC ............ *G01M 3/184* (2013.01); *E03B 7/071* (2013.01); *G08B 21/20* (2013.01); *G08B 21/12* (2013.01)

(58) Field of Classification Search
 CPC ........ E03B 7/071; G01M 3/184; G08B 21/12; G08B 21/20
 See application file for complete search history.

(56) References Cited

U.S. PATENT DOCUMENTS 4,324,268 A * 4/1982 Jacobson ............. D06F 39/081
 137/312
5,409,037 A * 4/1995 Wheeler ............... G01M 3/243
 137/487.5

(Continued)

FOREIGN PATENT DOCUMENTS

CN      103791142 A    5/2014    ............. F16K 31/11

OTHER PUBLICATIONS

Notification of Transmittal of the International Search Report and the Written Opinion of the International Searching Authority, or the Declaration, dated Jan. 28, 2019, which was issued by the International Searching Authority of WIPO in Applicant's corresponding international PCT application having Serial No. PCT/US2018/052558, filed on Sep. 25, 2018.

(Continued)

*Primary Examiner* — Quan-Zhen Wang
*Assistant Examiner* — Rajsheed O Black-Childress
(74) *Attorney, Agent, or Firm* — Bodner & O'Rourke, LLP; Gerald T. Bodner; Christian P. Bodner

(57) ABSTRACT

A system for detecting a gas, oil or water leak and closing a fluid valve in response thereto includes a control unit in which an electronic circuit is mounted. A fluid leak sensor is electrically connected to the electronic circuit. A manipulator unit is operatively coupled to the fluid valve. The fluid leak sensor generates a fluid leak detection signal when a fluid leak is detected. The electronic circuit, in response to the fluid leak detection signal, generates a control signal and provides the control signal to the manipulator unit which, in response to the control signal, causes the fluid valve to close.

35 Claims, 34 Drawing Sheets

(51) Int. Cl.
    *E03B 7/07*          (2006.01)
    *G08B 21/12*      (2006.01)

(56) References Cited

U.S. PATENT DOCUMENTS

| | | | | |
|---|---|---|---|---|
| 7,044,154 | B2* | 5/2006 | Henderson | E03B 7/071 |
| | | | | 137/312 |
| 7,066,192 | B1* | 6/2006 | Delaney | F16K 31/055 |
| | | | | 137/15.18 |
| 9,976,288 | B2* | 5/2018 | McAward | E03B 7/071 |
| 2005/0224118 | A1 | 10/2005 | Tornay | 137/624.11 |
| 2007/0289635 | A1 | 12/2007 | Ghazarian et al. | 137/312 |
| 2008/0143540 | A1 | 6/2008 | Savla | 340/605 |
| 2008/0314466 | A1* | 12/2008 | Cimberio | F16K 11/20 |
| | | | | 137/883 |
| 2017/0044744 | A1 | 2/2017 | Everhart | |

OTHER PUBLICATIONS

Written Opinion of the International Searching Authority, dated Jan. 28, 2019, which was issued by the International Searching Authority of WIPO in Applicant's corresponding international PCT application having Serial No. PCT/US2018/052558, filed on Sep. 25, 2018.
International Search Report, dated Jan. 28, 2019, which was issued by the International Searching Authority of WIPO in Applicant's corresponding international PCT application having Serial No. PCT/US2018/052558, filed on Sep. 25, 2018.

* cited by examiner

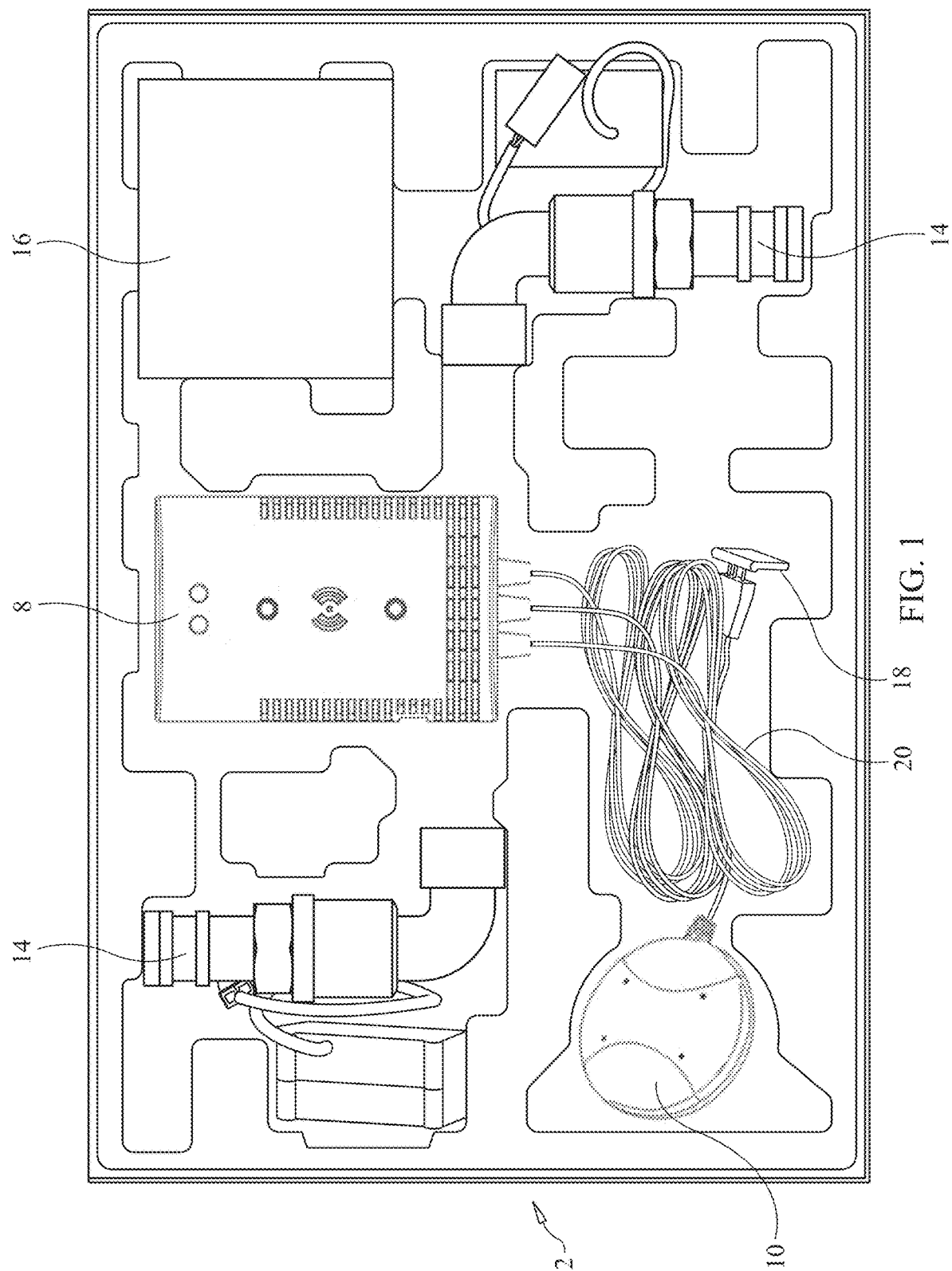

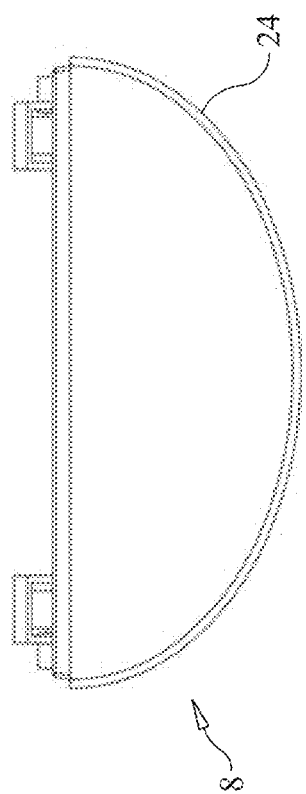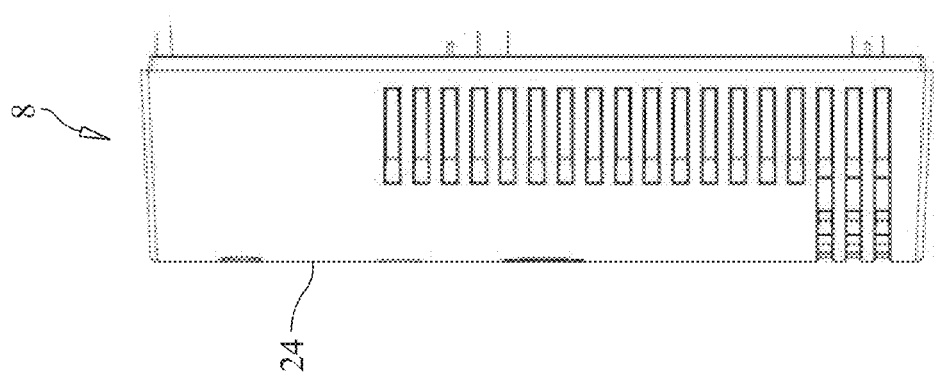

| Button | Function | Button Pressing time | Valve | Yellow LED | Green LED | Red LED | Alarm |
|---|---|---|---|---|---|---|---|
| Test/Reset | Leaking situation is eliminated | One click with less than one second | Open | Flashing 10 seconds | Steady on after Yellow 10 seconds flashing | Off | Alarm for 3 seconds, alarm off |
| | Under normal operation mode | One click with less than one second | Close | Flashing 10 seconds, then steady on for 3 seconds | Off | Off | Steady on |
| Test/Reset | After pressing the test function / the system should be back to "Normal Operating" within 23 Seconds | No other Button pressing is required, system should go back to Normal operating mode by itself | Open | Flashing 10 seconds | On | Off | Alarm sound should be off (after 16 seconds) after the test function is completed and system is back to Normal by itself |
| Test/Reset | Vacation mode | Press & hold for 3 seconds - Vacation mode activating | Close | Flashing 10 seconds, then steady on | Off | Off | Off |
| Alarm off | When alarm is activating | One click with less than one second | Close | Flashing 10 seconds, then steady on | Off | 1. Under test mode, red LED off 2. Leakage detected, red LED steady flashing | Off |
| | Power Outage function | NA | Close by supercap | Off | Off | Off | Off |
| | Power is back - Normal operation mode | NA | Open | Flashing 10 seconds | Steady on after Yellow 10 seconds flashing | Off | Off |
| | Power is back and leakage detected | NA | Close | Flashing 10 seconds, then steady on | Off | Steady flashing | Steady on |
| Alarm 10 sec buzzer shut off | When sensor detect water leakage buzzer alarm 10 sec then shut off | Setting: Alarm off button pressing 2 sec | Open | Under standby mode, yellow LED on 2 seconds then shut off 1 second | On | 1. Under test mode, red LED off 2. Leakage detected, red LED steady flashing | Alarm for 10 seconds, alarm off |
| Remark | Software Version | V2 Check sum: 3C1EH | | JEBSEE Approval | James Huang | Customer Approval | |

FIG. 4

SYSTEM HAVING A WATER OR GAS LEAK DETECTION CIRCUIT AND AUTOMATIC VALVE CLOSURE MECHANISM CONTROLLED THEREBY

CROSS-REFERENCE TO RELATED APPLICATIONS

This application is related to U.S. Provisional Patent Application Ser. No. 62/564,539, filed on Sep. 28, 2017, and entitled "System Having A Water Or Gas Leak Detection Circuit And Automatic Valve Closure Mechanism Controlled Thereby", the disclosure of which is hereby incorporated by reference and on which priority is hereby claimed

BACKGROUND OF THE INVENTION

Field of the Invention

The present invention generally relates to water (or gas) leak detection sensors and more particularly relates to alarm systems which alert a homeowner when a water leak is detected in the homeowner's premises.

Description of the Prior Art

There exist sensors and alarm systems that detect a high water level accumulating in the premises of a homeowner. The sensor is placed on the floor in a room or basement of the premises, and detects the accumulation of water on the floor. The sensor is connected to an alarm system which sounds an audible alarm to alert the homeowner of a water leak in the premises. The sensor may also be connected to a circuit which sends a signal, over the internet, to a remote computer or cellular telephone, to alert the homeowner of a water leak. There are also gas sensing devices and tools used by technicians and utility workers to detect a gas leak, be it refrigerant in a cooling system, such as a refrigerator, or propane or natural gas.

However, it is not known to the inventor herein of any such sensor or alarm system which can not only detect a water or gas leak but also automatically shut off a water valve or gas valve in the homeowner's premises to prevent further water leakage or gas leakage and to minimize damage to the homeowner's premises and to alert person's residing in the premises of an unsafe and dangerous condition.

OBJECTS AND SUMMARY OF THE INVENTION

It is an object of the present invention to provide a water or gas leak detection circuit and an automatic valve closure mechanism controlled thereby.

It is another object of the present invention to provide a water or gas leak detection circuit and valve shut off mechanism which may be easily installed by a homeowner without the need to consult or employ a specialized technician or installer.

It is still another object of the present invention to provide a water or gas leak detection circuit and automatic valve closure mechanism that is controlled by the detection circuit which not only alerts persons residing in the premises in which the detection circuit is installed of a water or gas leak but also acts to shut off water or gas provided to the premises or to the appliance causing the leak to minimize damage to the premises and the likelihood of injury to persons residing in the premises.

It is a further object of the present invention to provide a water or gas leak detection circuit and automatic valve closure mechanism controlled thereby which senses a water or gas leak and which is attachable to existing plumbing and/or valves in the premises in which the detection circuit is installed to automatically stop the flow of water or gas through the plumbing of the premises upon detection of a water or gas leak.

It is still a further object of the present invention to provide a water or gas leak detection circuit and automatic valve closure mechanism controlled thereby which is customizable by the homeowner installing the detection circuit and which may, if desired by the homeowner, be programmed to a "vacation mode" in which water or gas may be prevented from flowing through plumbing to which the automatic valve closure mechanism is connected for extended periods of time.

It is yet another object of the present invention to provide a water or gas leak detection circuit and automatic valve closure mechanism controlled thereby which periodically exercises plumbing valves in a homeowner's premises to which the detection circuit and mechanism are operatively coupled to prevent the valves from becoming "frozen" or difficult to turn due to mineral deposits.

In accordance with one form of the present invention, a system for detecting a water leak or a gas leak and for closing a plumbing valve to stop the leak basically includes a water or gas leak detection circuit and an automatic valve closure mechanism controlled thereby. More specifically, the system includes a main control unit, one or more sensors to detect water or gas, and one or more ball valves or other forms of valves having built-in gear mechanisms to automatically move the valves to an open or closed position in response to a signal received from and transmitted by the main control unit.

For example, a particular form of the system of the present invention, which is intended for use with a clothes washing machine, includes two automatic ball valve units, for the hot and cold water supply. For a dishwasher, the system includes one automatic ball valve connectable to the hot water supply line. For an ice maker or refrigerator appliance, the system of the present invention includes a one-quarter inch automatic ball valve.

In another form of the present invention, instead of the system including one or more ball valves, the system may include one or more manipulator mechanisms or units to move ball or other types of valves existing in the premise's plumbing. The manipulator units are installed over existing ball valves, and each has an internal motor that engages and rotates the handle of the ball valve by ninety degrees, or a quarter turn, or some other degree of rotation, in order to open or close the valve, in the same way that a person would turn a handle of the ball valve to allow water to flow therethrough or close the ball valve. The manipulator unit is envisioned to be used with a hot water tank or a main water pipe in residential premises.

The sensors are used to detect water leaking from a clothes washing machine, a dishwasher, a hot water tank, an icemaker or a refrigerator. For a furnace unit, the sensor is a gas leak detector instead of a water leak sensor.

When used with a clothes washer, the sensor of the system of the present invention detects water accumulating on the floor of the premises. The sensor, situated on the floor in proximity to the clothes washer, sends a signal to the main control unit, and the main control unit will send signals to both the hot and cold water valves to activate the internal motors of the built-in gear system of the valves to close the valves to stop water flowing to both the hot and cold water hoses leading to the clothes washer.

For a hot water tank or for a whole home main water pipe protection, the system of the present invention uses one manipulator unit to control the cold water supply provided to the tank or the main water pipe. The manipulator unit is installed on the ball valve pre-existing in the plumbing leading to the hot water tank (or the shut off valve of the entire premises), to control the opening or closing of the ball valve. When the sensor located on the floor and situated near the hot water tank (or area underneath the main water pipe) detects any leakage of water either from the hot water tank itself or from the pressure release valve on the tank, the sensor sends a signal to the control unit which, in turn, sends a control signal to the manipulator unit so that the manipulator unit will turn or move the handle of the ball valve to which it is attached preferably ninety degrees or whatever angle is required to close the ball valve in the water supply plumbing so that cold water supplied to the hot water tank or to the premises will be prevented from flowing into the leaking tank.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 1 illustrates a pre-packaged kit containing the system of the present invention and the various components thereof for automatically closing the hot water and cold water plumbing leading to a clothes washer to which the system is attached when a leak is detected.

FIG. 2C is a right elevational view of the control unit of the system of the present invention shown in FIGS. 2A and 2B.

FIG. 2D is a top plan view of the control unit of the system of the present invention shown in FIGS. 2A-2C.

FIG. 4 is a table illustrating the functionality of certain switches on the control unit of the system of the present invention and various alarms and indications provided by audible alarms and visual indicators forming part of the control unit of the present invention.

DETAILED DESCRIPTION OF THE PREFERRED EMBODIMENTS

Figure 2B:
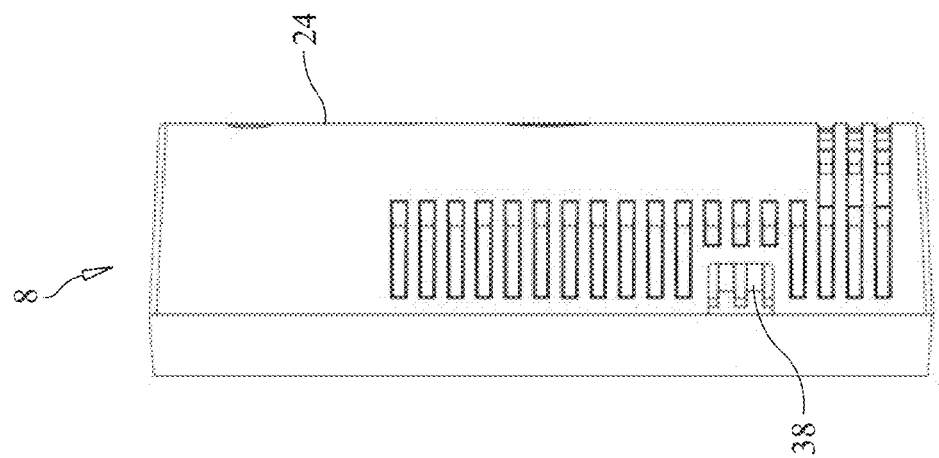
FIG. 2B is a left elevational view of the control unit of the system of the present invention shown in FIG. 2A.
Figure 2A:
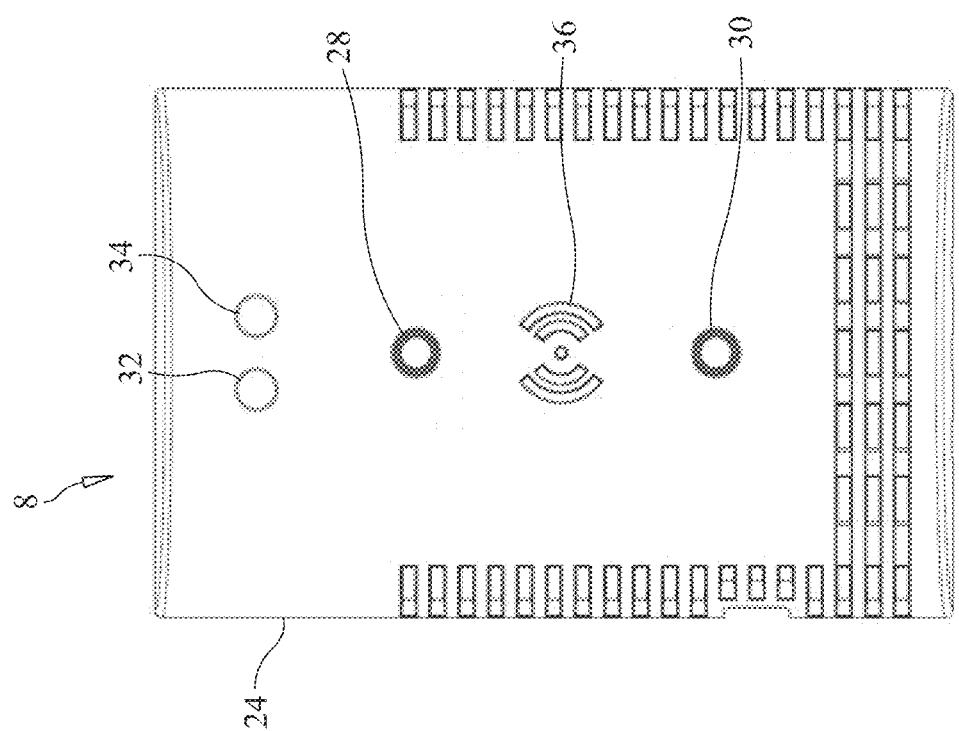
FIG. 2A is a front elevational view of the control unit of the system of the present invention for automatically closing a valve in the plumbing of a residence when a water or gas leak is detected.

Referring initially to FIG. 1 of the drawings, it will be seen that a system 2, in kit form, for detecting a water leak, in this example, from hoses 4 connected to a clothes washer 6 in a residence, and for preventing the flow of hot and cold water to the clothes washer 6, includes a main control unit 8, a sensor 10 to detect water accumulating on the floor 12 near where the clothes washer 6 is situated, a pair of ball valves with built-in gear systems 14 to automatically move the ball valves to an open or closed position in response to a control signal received from the main control unit 8, and a power supply 16 for powering the internal circuitry of the main control unit 8. The kit also includes fasteners 18 for mounting the control unit 8 and various electrical cables 20 connected to the water sensor 10 and the ball valve actuators 14 to a supporting surface 22.

As shown in FIGS. 2A-2D of the drawings, the control unit 8 includes a housing 24 that defines an internal cavity in which the electrical circuitry 26 is situated and on which various switches 28, 30, indicators 32, 34 and a transducer 36 are located and exposed on the housing 24. Preferably, there are two indicators 30, 32, which are preferably light emitting diodes (LEDs), a first LED indicator 30 illuminating in yellow to indicate that water is shut off, and a second, multi-color LED indicator 34 which when illuminated in green indicates that the valves 14 are open to allow water to flow to the clothes washer 6 and when illuminated in red indicates that a water leak has been detected and that the valves 14 are closed, which will be explained in greater detail. The control unit 8 also includes a "Test/Reset" push button switch 28 mounted on the housing, and an "Alarm Off" push button switch 30 also mounted on the housing 24, for the user to press. Additionally, the housing 24 of the control unit 8 includes an audible alarm transducer 36 which sounds a piercing alarm when a water leak is detected in order to alert persons residing in the premises.

On one side of the housing is situated a receptacle or jack 38 for receiving the plug 40 of a power unit 16. The plug 40 is connected to a cable emanating from a DC (direct current) voltage power supply module that is plugged into an ordinary 120 VAC outlet 42 situated near the clothes washer 6 and which converts the 120 VAC power to preferably 12 VDC.

Reference should now be had to FIGS. 5A-5L of the drawings, which illustrate the installation of the system 2 of the present invention and the operation thereof.

Figure 5B:
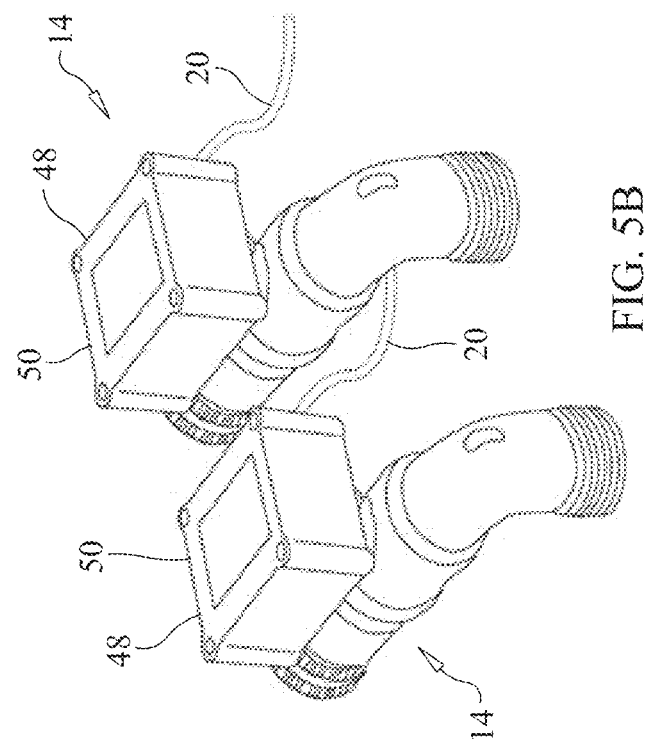
FIGS. 5A-5L are various illustrations showing the components of the system of the present invention and illustrating how a homeowner, with no technical background, may easily install the system in his residence to control the flow of hot and cold water to a clothes washer.
Figure 5A:
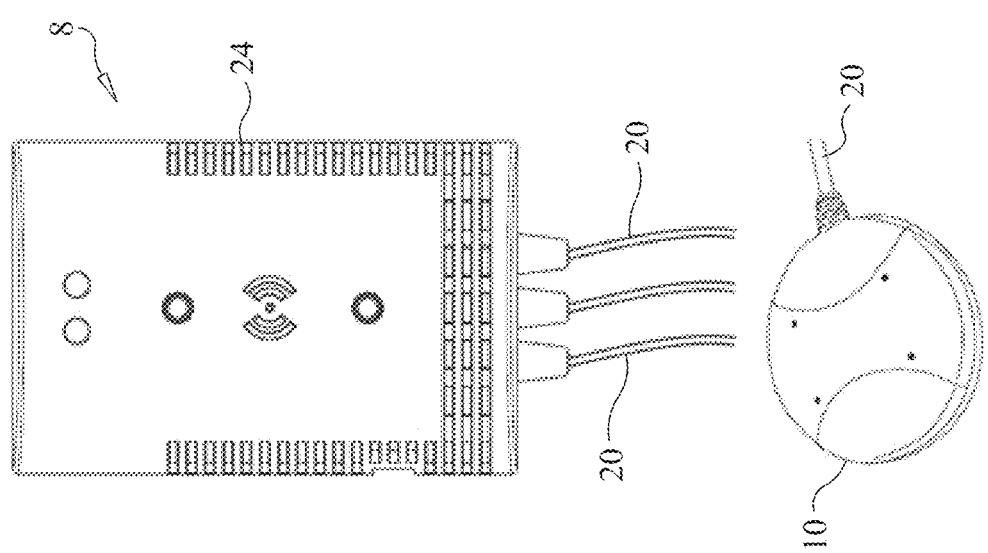
Figure 5D:
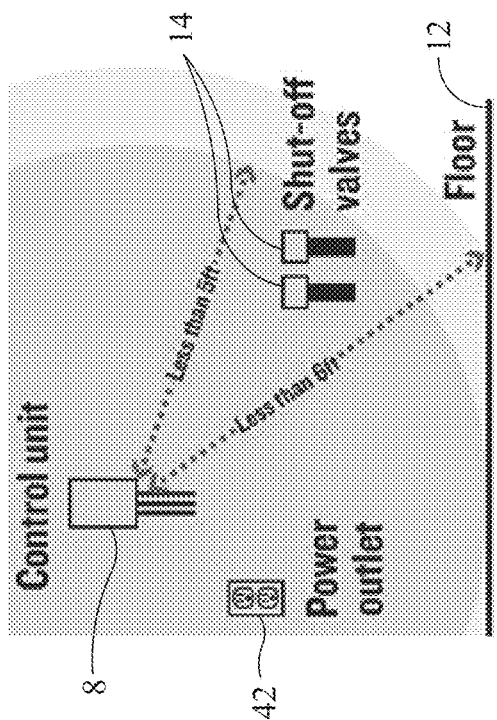

As mentioned previously in relation to FIG. 1 of the drawings, the system 2 of the present invention, provided to the user as a kit, includes a main control unit 8 with connection wires 20 attached, a power adapter 16 for the control unit 8 and a water sensor 10 for the control unit 8 (see FIG. 5A). The system 2 further includes two automatic shutoff valves 14 having motor driven gear mechanisms attached thereto for closing and opening the valves (see FIG. 5B). The kit 2 also includes a number of fasteners 18 and a template for mounting the control unit 8 to a wall 44 of the residence near where the clothes washer 6 is located, including double-sided tape, dry wall screws with anchors, masonry screws, wire ties and wire ties with double-sided tape for mounting the electrical cables 20 from the water sensor 10 and the automatic shut off valves 14 to a wall 44 or other supporting surface 22 in the residence, and other assorted components.

Figure 5C:
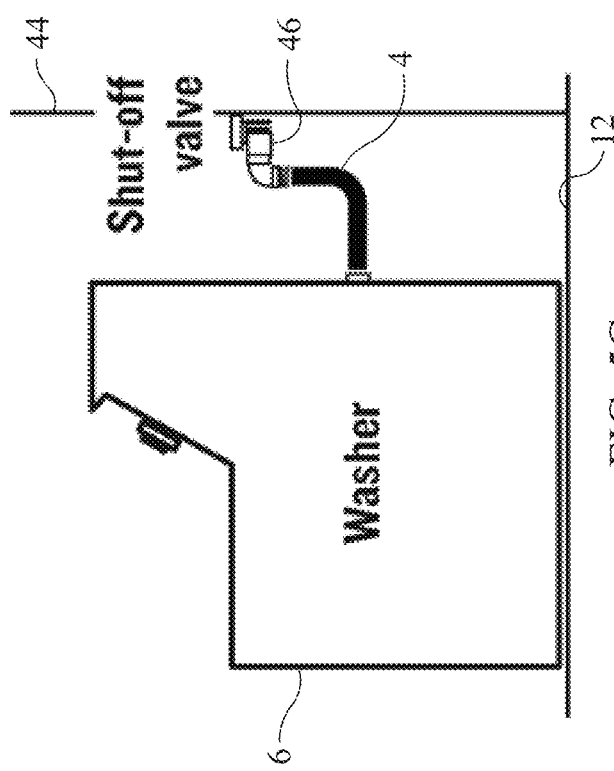

To install the system 2 of the present invention, in this example, for controlling the flow of hot and cold water to a clothes washer 6, the purchaser of the system 2 first locates the clothes washer's shut off valves 46 for the hot and cold water, which are usually located behind or next to the clothes washer 6, with hoses 4 leading to the clothes washer 6 (see FIG. 5C). Then, the installer, who may be the homeowner having no technical background, finds the best location to mount the control unit 8 of the system 2. The control unit 8 should be located close enough to the shut off valves 14 and the floor 12 near the clothes washer 6 for the sensor wire 20 and the control lead wires 20 connected to the shut off valves 14 to reach. The control unit 8 also needs to be mounted in a location in close proximity to a power outlet 42 (see FIG. 5D).

The control unit 8 is then mounted to a wall 44 in proximity to the clothes washer 6. Double-sided tape may be used, or dry wall screws with anchors, or the masonry screws which are provided with the kit. The kit also includes a mounting template, as mentioned previously, to help the person installing the control unit 8 find the proper location where the dry wall screws or masonry screws should be situated.

The installer of the system 2 of the present invention should then turn off his existing hot and cold water valves 46 to which the flexible hoses 4 of the clothes washer 6 are attached. Usually, when the shut off valves 46 are in the on or open position, they are pointing towards the hose 4, as shown in FIG. 5E of the drawings. Each valve 46 should be turned ninety degrees counterclockwise to turn it off. Before the hoses 4 leading to the clothes washer 6 are removed, a bucket should be placed under the existing water valves 46, as the hoses 4 are probably filled with water and will most likely leak when they are unscrewed from the valves 46. The washing machine hoses 4 are then removed, and the installer should keep track of which hoses 4 were connected to the hot water valve 46 and the cold water valve 46.

Figure 5F:
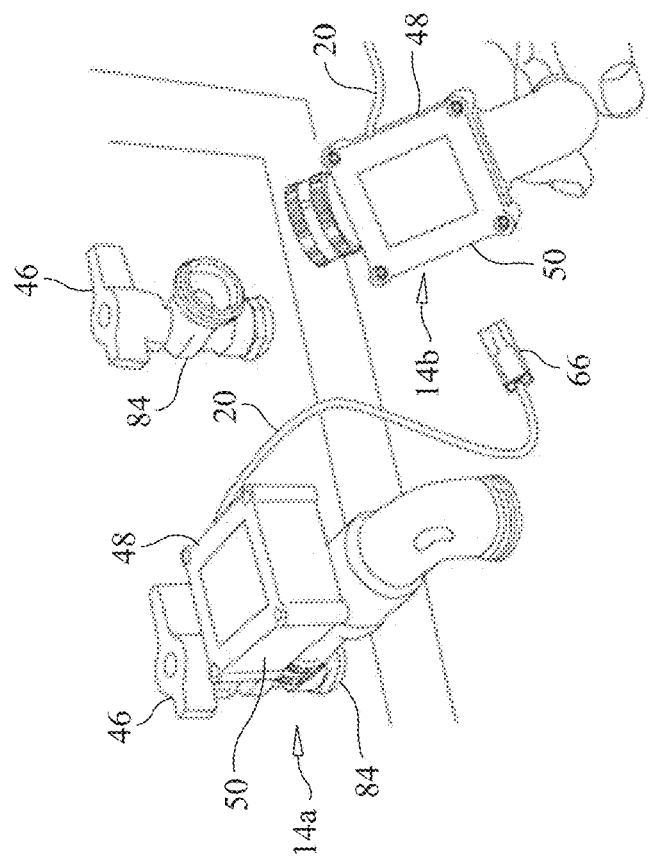
Figure 5E:
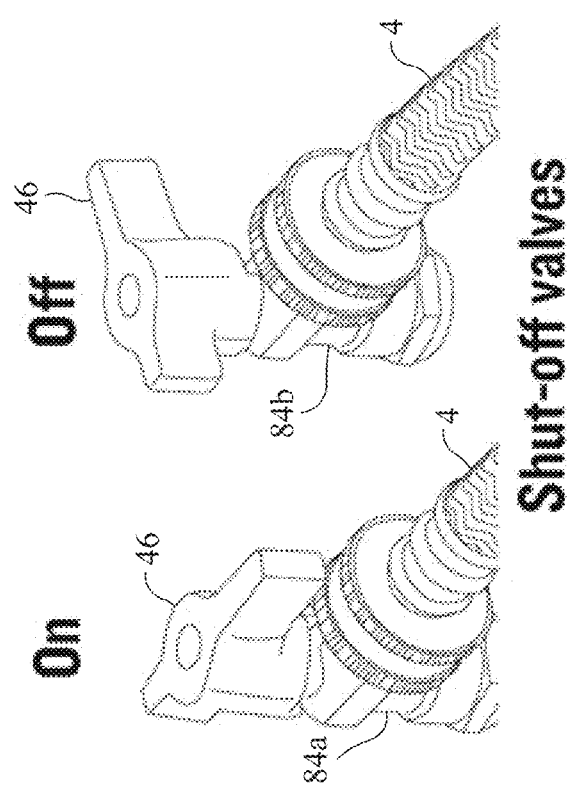

As shown in FIG. 5F of the drawings, the automatic shut off valves 14 of the system 2 of the present invention should now be installed on the existing hot and cold water valves 46. The valve actuators 48, forming part of the shut off valves 14, have housings 50 which are color coded to help the installation process. For example, the red-colored automatic shut off valve 14 should be connected to the red, hot water valve 46 of the residence's existing plumbing, and the blue-colored automatic shut off valve 14 should be connected to the blue, cold water valve 46 of the residence's existing plumbing.

The housing 50 of each valve actuator 48 defines an internal cavity 52 in which is situated a motor 54 whose shaft 56 is connected to gearing 58 which, in turn, is coupled to a ball valve 60 mounted within a ninety degree (90°) elbow or right angle hose fitting 62. The motor 54, when actuated by a signal, such as a DC voltage of positive or negative voltage, will cause the motor shaft 56 to rotate in one direction or the other (i.e. clockwise or counterclockwise). Rotation of the motor shaft 56, coupled to the ball valve 60 through the gearing 58, will, in turn, cause the ball valve 60 in the fitting 62 to open or close the fitting 62 to the flow of water therethrough (see FIGS. 7-9). Limit switches 64a, 64b may be used to limit the rotational movement of the motor shaft 56 or gearing 58 and to limit the rotation of the ball valve 60 to the fully open and fully closed state. Alternatively, the motor 54 of each valve actuator 48 may be a stepper motor, the rotation of the shaft 56 of which in a clockwise or counterclockwise direction is controlled by a digitally-coded signal provided by the main control unit 8 to the stepper motor 54.

Figure 5G:
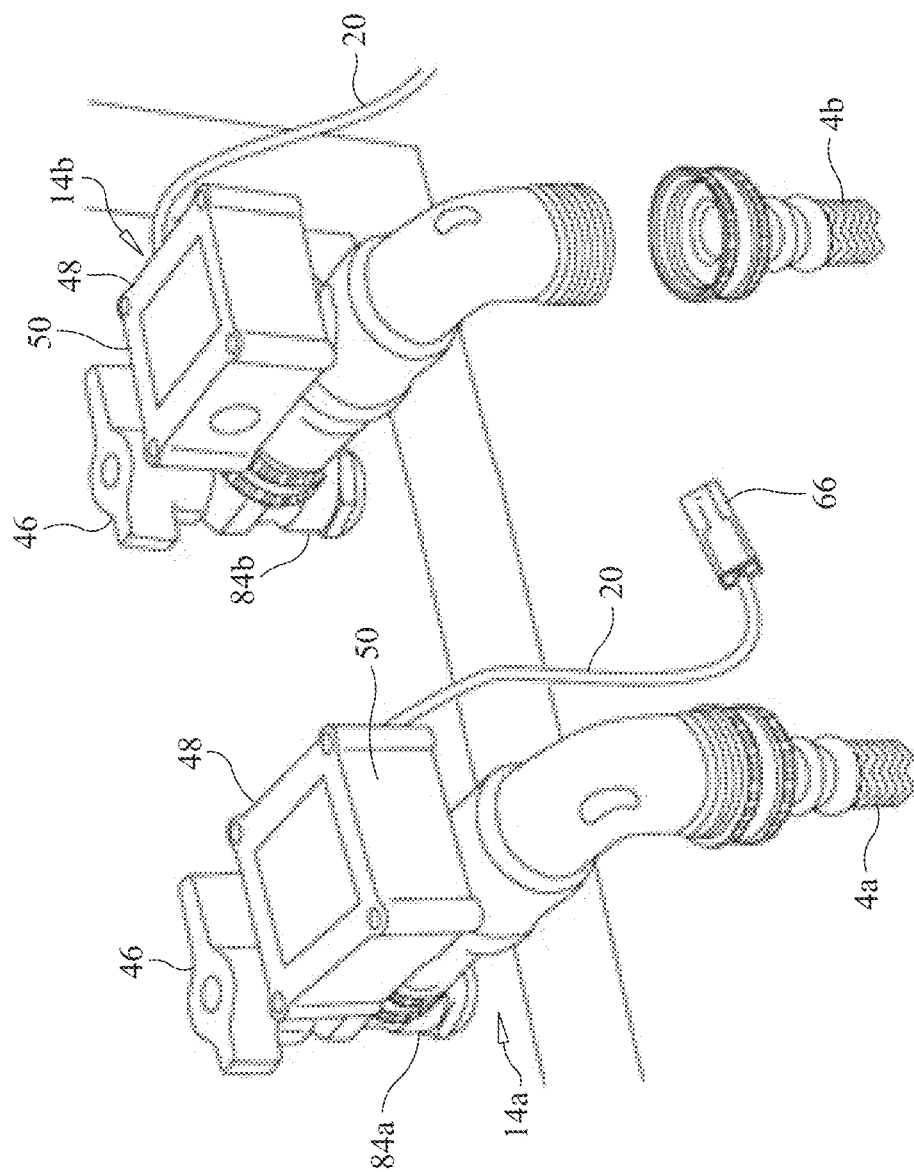

Next, and as shown in FIG. 5G of the drawings, the flexible hoses 4 for the hot and cold water leading to the clothes washer 6 are screwed onto the outlets of the fittings 62 of the automatic shut off valves 14 and tightened.

Figure 5I:
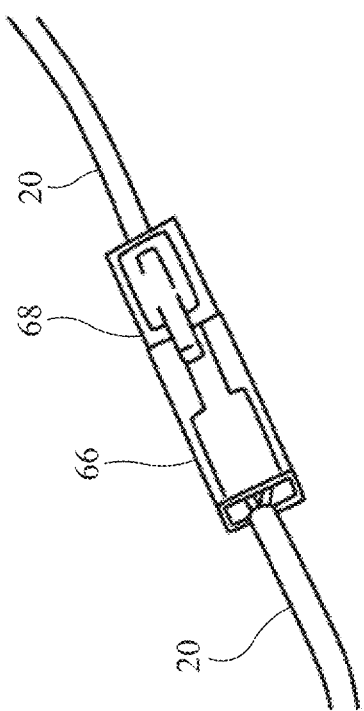
Figure 5H:
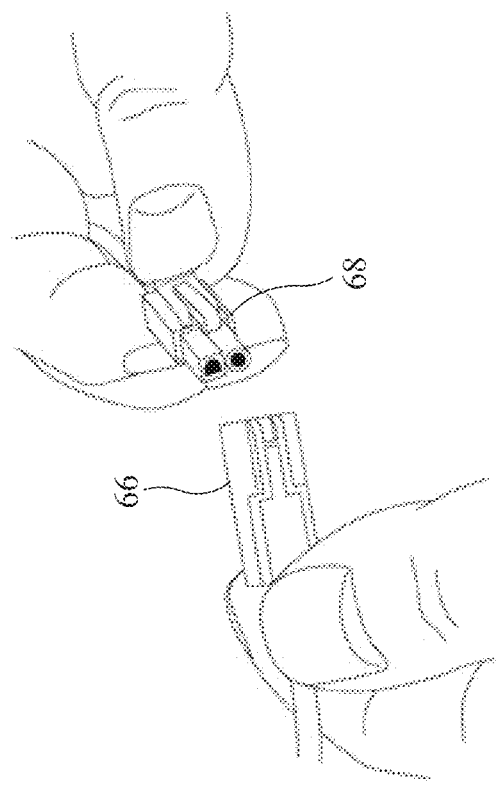
Figure 5J:
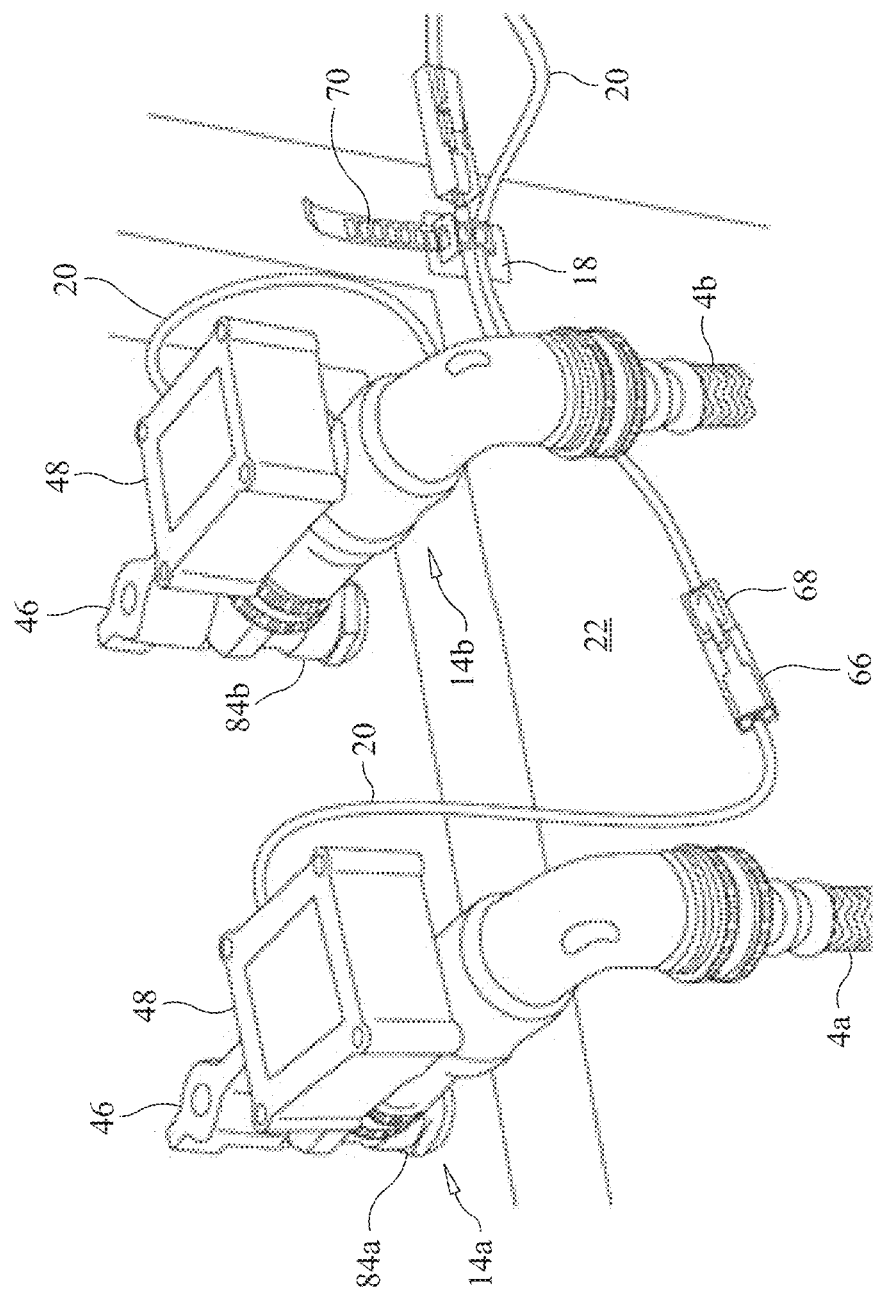

Electrical cables 20 emanating from the housing 24 of the main control unit 8 and connected to the electronic circuitry 26 situated therein (see FIGS. 3 and 6) are provided with connectors 66 at their free axial ends. The connectors 66 of these lead cables 20 are coupled to mating connectors 68 of electrical wires 20 extending from the hot water and cold water automatic shut off valves 14, as shown in FIGS. 5H and 5I of the drawings. Wire ties 70 are provided to dress the wires 20 and attach them to the wall 44 so that they are out of the way, as shown in FIG. 5J of the drawings.

Figure 5L:
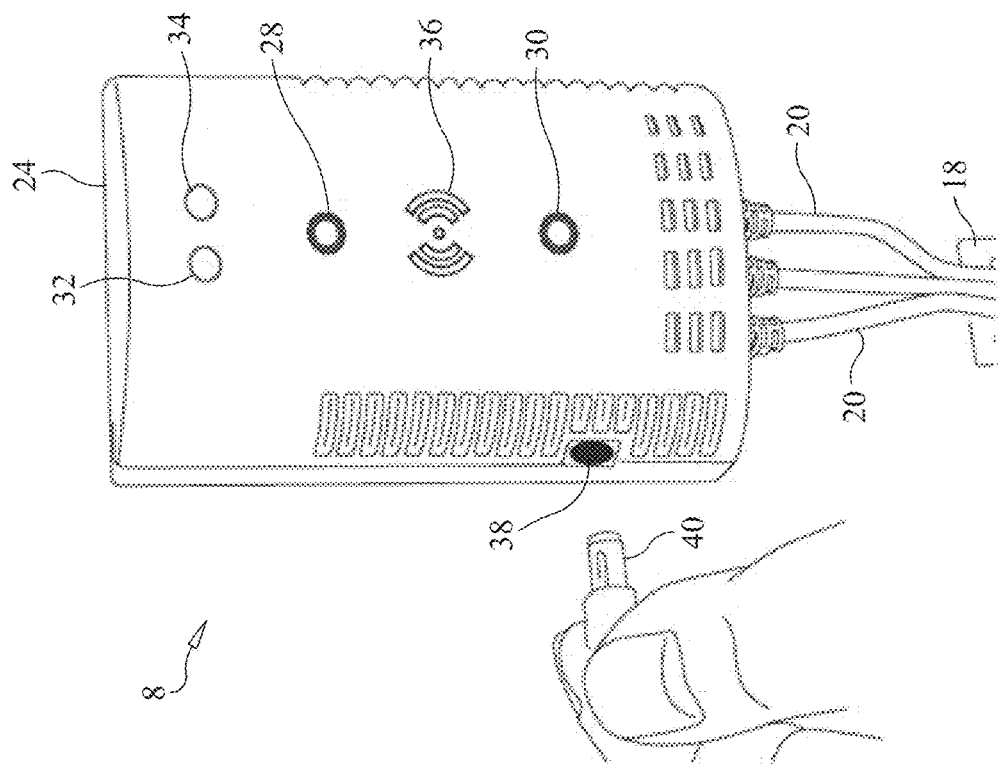
Figure 5K:
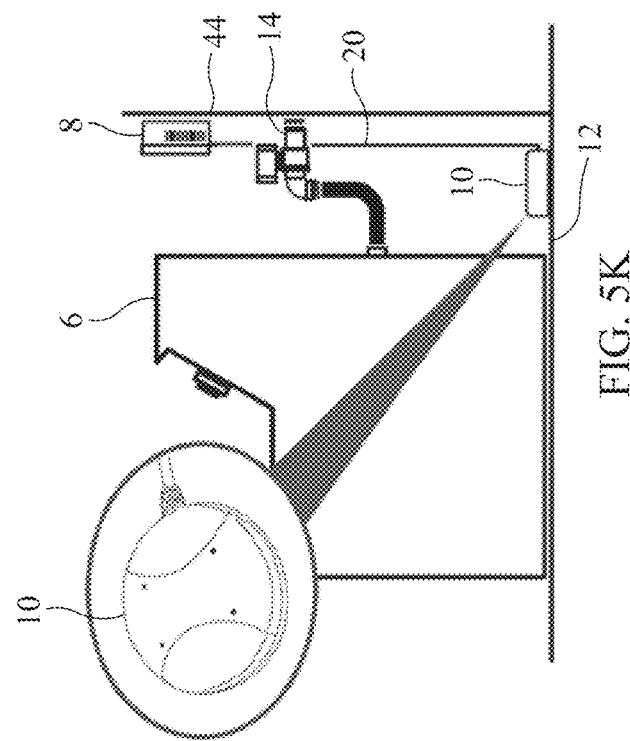

The water leak sensor 10 is placed on the floor 12 beneath the water shut off valves 14, as shown in FIG. 5K of the drawings. The leak sensor 10 is connected by an electrical cable 20 that emanates from the housing 24 of the main control unit 8.

The power unit 16 is plugged into an ordinary AC wall outlet 42, and the adaptor plug 40 at the free end of the cable connected to the power adaptor is plugged into the jack 38 on the side wall of the control unit 8, as shown in FIG. 5L of the drawings.

When the control unit 8 first powers on, the yellow indicator light 32 on the front wall of the housing 24 flashes; this is an indication that the automatic shut off valve system 2 is arming and opening the valves 14. When the green indicator light 34 comes on, the system 2 of the present invention is ready to use.

The user of the system 2 should then turn the laundry valves 46 of the existing plumbing ninety degrees clockwise to turn the water supply on for both hoses 4 leading to the clothes washer 6 to check for any leaks and to tighten the hose fittings if need be.

To test the system 2 of the present invention, the user presses and releases the Test/Reset push button switch 28 on the front wall of the housing 24 of the main control unit 8. The electronic circuit 26 of the system 2 causes the alarm 36 to emit an audible sound, the automatic valves 14 to close and to cause the yellow indicator 32 on the control unit 8 to start flashing. Once the valves 14 are completely closed, the control unit 8 will automatically reopen them again. The yellow light 32 flashes while the valves 14 are reopening. The green light 34 comes on when the valves 14 have finished reopening. The test process takes preferably about 25 seconds to complete and return to a normal state, with the valves 14 open and the green light 34 on.

If the sensor 10 resting on the floor 12 near the clothes washer 6 detects an accumulation of water, the electrical circuitry 26 within the control unit 8 sounds the alarm 36 and closes the automatic hot and cold water valves 14. The circuitry 26 also causes the yellow and red indicators 32, 34 on the control unit 8 to start flashing. If the user wishes to shut off the audible alarm 36, he may press the "Alarm Off" push button switch 30 on the housing 24 of the control unit 8. Even if the audible alarm 36 is disabled, the valves 14 will still remain closed.

The audible alarm 36 keeps sounding until it is turned off or until the sensor 10 no longer detects water. The user can customize the control unit 8 and the electronic circuitry 26 thereof so that the audible alarm 36 only sounds for ten seconds, for example. In order to change the audible alarm 36 to sound for a predetermined period of time, such as ten seconds, the user presses and holds the "Alarm Off" push button switch 30 for a few seconds. Then, the yellow indicator light 32 flashes to show that the user has changed the audible alarm 36 to sound for only ten seconds, but the user may return to a constant audible alarm state by pressing and holding the "Alarm Off" push button switch 30 again.

Once a leak is fixed and the sensor 10 is dried off, the user presses and releases the "Test/Reset" push button switch 28 on the front wall of the housing 24 of the control unit 8. The electronic circuitry 26 within the control unit 8 will cause the yellow indicator light 32 to flash while the valves 14 are reopening. The green indicator light 34 will then illuminate when the valves 14 have completely reopened.

In the event of a power failure, the electronic circuitry 26 within the control unit 8 will automatically close the hot and cold water shut off valves 14, and then powers off. When power returns, and if the sensor 10 does not detect any water, the electronic circuitry 26 will then open the valves 14 again.

Another feature of the system 2 of the present invention is that the system 2 may be customized by the user. As mentioned previously, the user may adjust the length of time that the audible alarm 36 sounds. But also, the system 2 may be placed in what is referred to as a "vacation mode". If the homeowner plans to be away from his residence for an extended period of time, the system 2 of the present invention may be placed in the "vacation mode" to close the valves 14 while the homeowner is gone. The homeowner presses and holds the "Test/Reset" push button switch 28 for preferably three seconds. Then, the electronic circuitry 26 within the control unit 8 causes the yellow indicator light 32 to flash while the valves 14 are closing and to turn a constant yellow color when the valves 14 have fully closed.

When the homeowner returns, he may press and release the "Test/Reset" push button switch 28 again to reopen the valves 14. The electronic circuitry 26 within the control unit 8 causes the yellow indicator light 32 to flash while the valves 14 are opening, and the green indicator light 34 comes on when the valves 14 have fully opened.

FIG. 4 is a table which describes the function that is performed by the electronic circuitry 26 of the system 2 of the present invention when certain push button switches 28, 30 are pressed, and further describes the status of the audible alarm 36 and the indicators 32, 34 in certain situations.

For example, when a water leak has been fixed, the user presses the "Test/Reset" push button switch 28 once for less than one second. The automatic shut off valves 14 will now open; the yellow LED 32 will flash for about ten seconds, and the green LED 34 will illuminate steadily after the yellow LED 32 has flashed for ten seconds. The red LED 34 will remain off. The alarm 36 will sound for three seconds, and then shut off.

Under normal operation mode, when the "Test/Reset" push button switch 28 is pressed for less than one second, the automatic shut off valves 14 will close. The yellow LED 32 will flash for ten seconds, and then remain steadily on for three seconds. The green LED 34 will remain off, and the red LED 34 will remain off. In this mode, the alarm 36 will remain steadily on during the "Test/Reset" mode.

Within about twenty-three seconds after the test function, mentioned above, has been performed, the system 2 will be back to a normal operating condition. No other push button switch 28, 30 needs to be pressed, and the system 2 will go back into its normal operating mode by itself. The valves 14 will be open, the yellow LED 32 will flash for ten seconds, the green LED 34 will turn on and the red LED 34 will be off. The alarm 36 will shut off after the test function has been completed and the system 2 is back to a normal operating condition.

If the user of the system 2 of the present invention wants to place the system 2 in the "vacation mode", he presses and holds the "Test/Reset" push button switch 28 on the control unit 8 for about three seconds to activate the vacation mode. This causes the valves 14 to close. The yellow LED 32 will flash for about ten seconds and then remain steadily on. The green LED 34, the red LED 34 and the audible alarm 36 will remain off.

To shut off the audible alarm 36, the user presses the "Alarm Off" push button switch 30 for less than one second. The valves 14 will close, the yellow LED 32 will flash for ten seconds and then remain steadily on, the green LED 34 will be off and the red LED 34 will be off when the system 2 is in a test mode, but will be steadily flashing when a leak is detected.

If a power outage occurs, the electronic circuitry 26 includes a super capacitor 72, the charge accumulating on which is sufficient to cause the valves 14 to close. The yellow, green and red LEDs 32, 34 will remain off, as well as the audible alarm 36, in order to conserve sufficient charge on the super capacitor 72 to close the valves 14. When power is returned, and no leak is detected, the electronic circuitry 26 will cause the valves 14 to reopen. The yellow LED 32 will flash for ten seconds, and the green LED 34 will remain steadily on after the yellow LED 32 has flashed for ten seconds. The red LED 34 will remain off, and the audible alarm 36 will be off.

When leakage is detected, the electronic circuitry 26 of the system 2 will close the valves 14 automatically. The yellow LED 32 will flash for ten seconds and then remain steadily on. The green LED 34 will remain off, the red LED 34 will be steadily flashing and the audible alarm 36 will be steadily on.

To program the system 2 so that the audible alarm 36 only sounds for ten seconds, the user presses the "Alarm Off" push button switch 30 for two seconds. Now, if a leak is detected, the alarm 36 will sound for only ten seconds and shut off.

Figure 3:
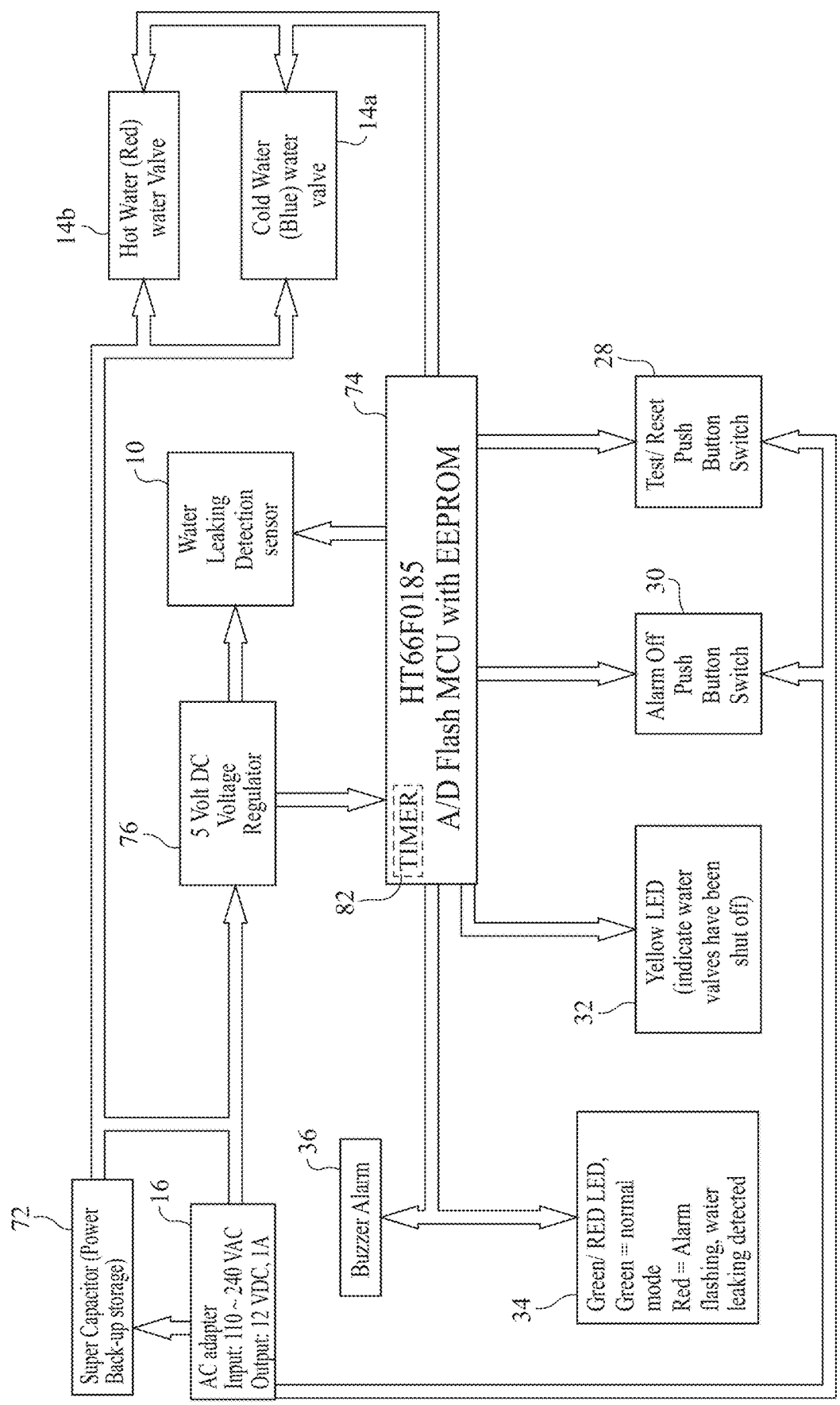
FIG. 3 is a block diagram of a preferred form of a circuit forming part of the system of the present invention for controlling the flow of water or gas through the plumbing of a residence when a water or gas leak is detected.

The preferred form of the electronic circuitry 26 of the system of the present invention is shown in FIG. 3 of the drawings. As can be seen from the block diagram of the circuit 26 shown in FIG. 3, the electronic circuitry 26 of the system 2 includes a microprocessor or microcontroller 74, which is preferably part number HT66F0185, which may be obtained from Holtek Semiconductor Inc. of Hsinchu, Taiwan. Microcontroller 74 is preferably a flash memory analog-to-digital (A/D) type eight-bit high performance RISC architecture microcontroller.

The microcontroller 74 controls the opening and closing of the cold water valve 14a and the hot water valve 14b.

As mentioned previously, a "Test/Reset" push button switch 28 and an "Alarm Off" push button switch 30 are provided in the circuit 26 as an interface for the user, and are connected to the microcontroller 74 to control the operation of the microcontroller 74.

The microcontroller 74 also controls the illumination of the green/red LED (light emitting diode) 34 and the yellow LED 32. The green/red LED 34 will illuminate in green when the system 2 is in a normal mode, and will illuminate in red or flashing red to indicate an alarm situation or that water leaking is detected. The microcontroller 74 also controls a buzzer alarm 36 to provide an audible indication to the user of the system 2.

A water leaking detection sensor 10 is connected to the microcontroller 74 when water is detected by the sensor 10.

An AC adapter 16, preferably having an input of 110 VAC (voltage, alternating current) or 240 VAC, and an output of 12 volts VDC (voltage, direct current) at 1A (amperes), provides power to the various components of the electronic circuitry 26 of the system 2, including the "Alarm Off" push button switch 30 and the "Test/Reset" push button switch 28, the hot water valve 14b and the cold water valve 14a. The output voltage from the AC adapter 16 is also provided to a DC voltage regulator 76, whose output is 5 volts DC. The output voltage from the voltage regulator 76 is provided to the water leaking detection sensor 10 and the microcontroller 74.

A super capacitor 72 functions as a power back-up storage device, and is charged by the output voltage from the AC adapter 16. The super capacitor 72 provides power to the 5 volt DC voltage regulator 76 and to the hot water valve 14b and the cold water valve 14a to close the valves 14a, 14b in the event of a power failure in the residence in which the system 2 of the present invention is installed.

Figure 6:
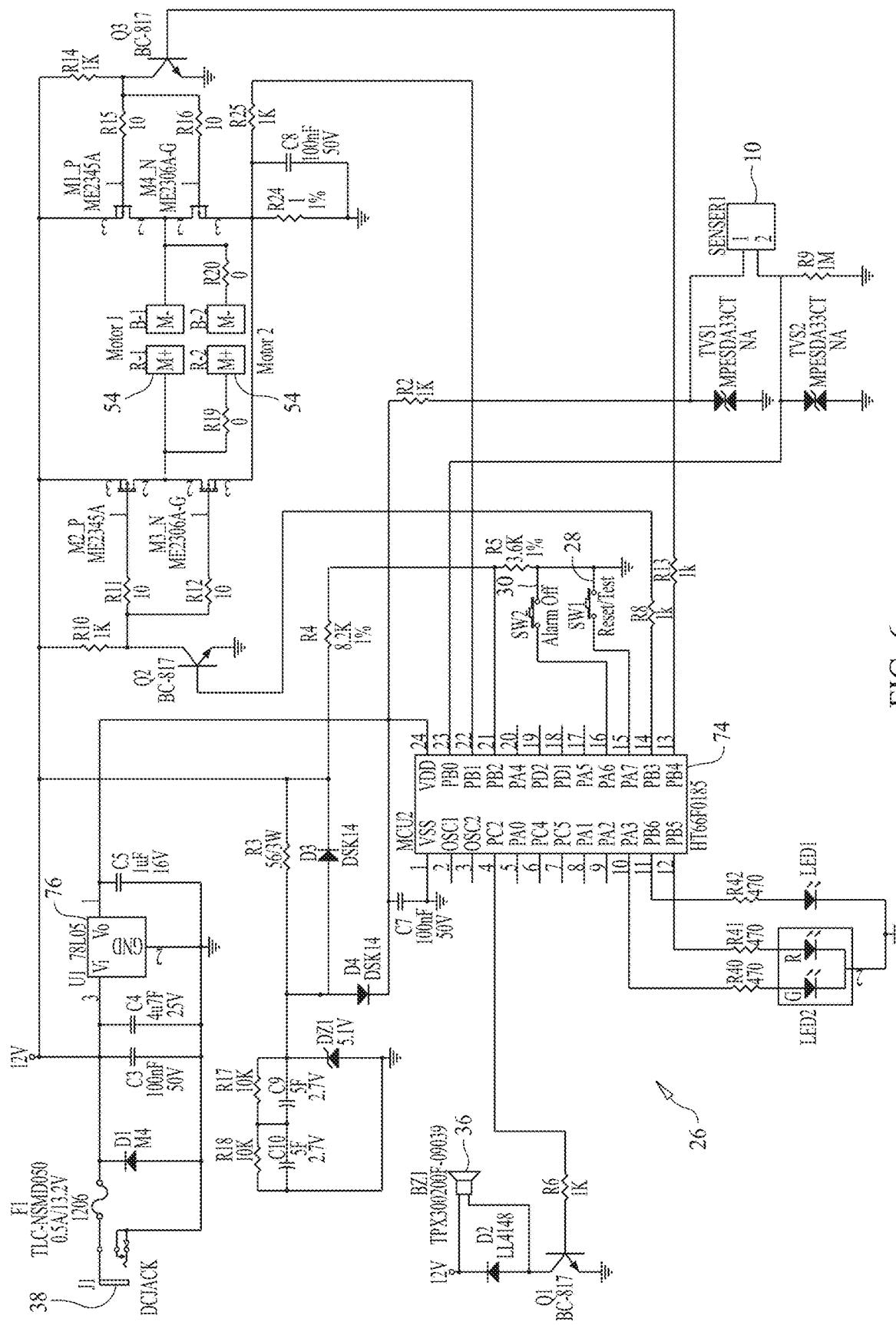
FIG. 6 is a schematic diagram of a preferred form of a circuit forming part of the system of the present invention for controlling the flow of water or gas through the plumbing of a residence when a water or gas leak is detected.

A schematic diagram of the electronic circuitry 26 of the system of the present invention is shown in FIG. 6 of the drawings, and its operation and components are evident from the aforementioned description of the system 2 and the block diagram of the circuitry 26 shown in FIG. 3.

What is described above is the system 2 of the present invention designed to shut off the flow of hot and cold water to a clothes washer 6. However, and as mentioned previously, the system 2 of the present invention may be used to control the water flow to a dishwasher, an ice maker, a refrigerator, a hot water tank or even the flow of water entering the premises through the water main. Normally, for a clothes washer 6, the system 2 of the present invention will include two automatic shut off valves 14, with a motor 54 and gearing 56 connected thereto, for the hot and cold water supply lines, as described previously. For a dishwasher, the system 2 of the present invention will include a three-eighths (⅜) inch automatic ball valve 60 for the hot water line. For an ice maker or refrigerator, the system 2 of the present invention will include a one quarter (¼) inch automatic ball valve 60.

Figure 8:
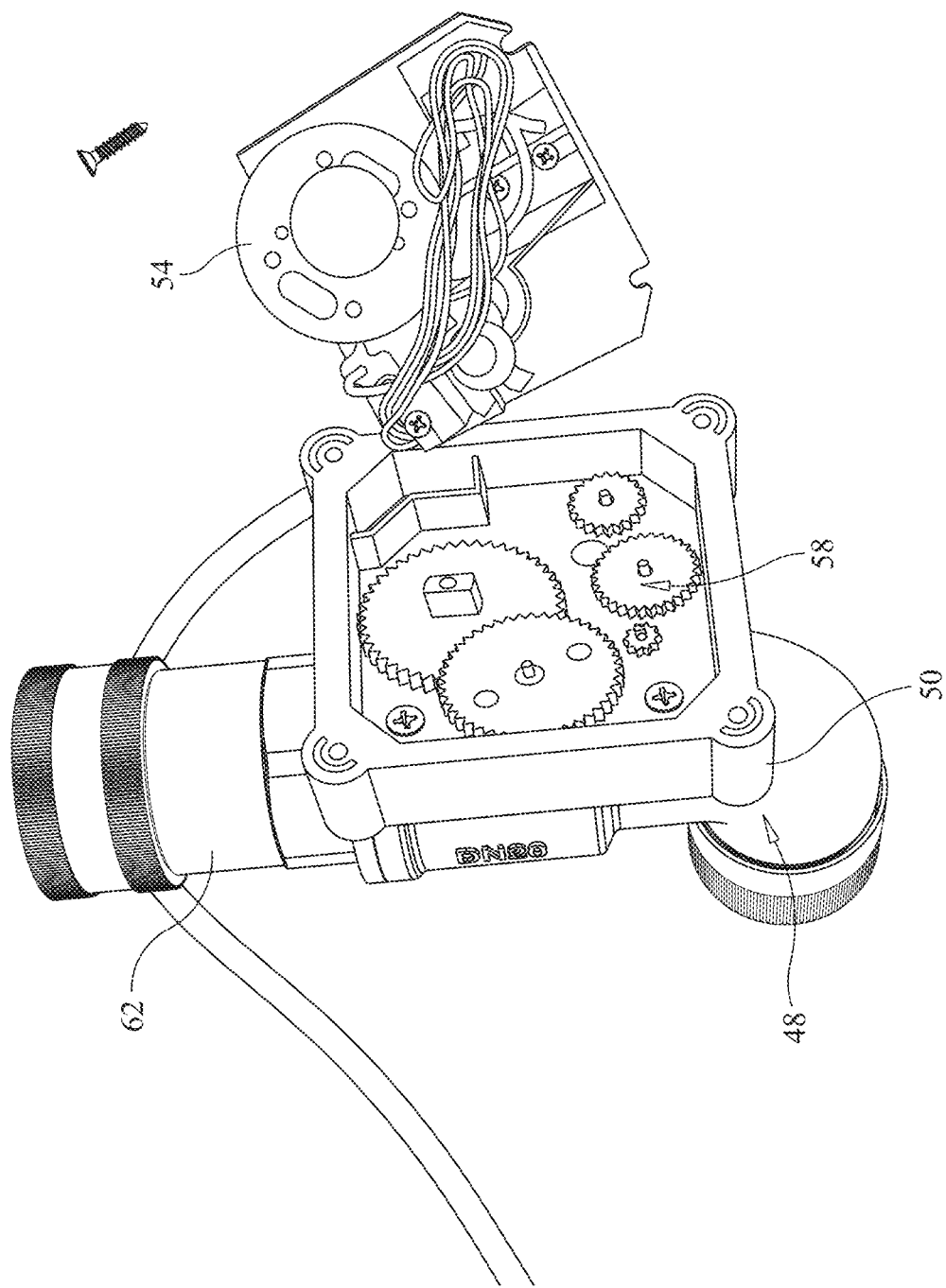
FIG. 8 is another perspective view of the ball valve and actuator portion thereof forming part of the system of the present invention, with the cover of the actuator portion removed to show the gearing, motor and other components of the actuator portion situated within the housing thereof.
Figure 8A:
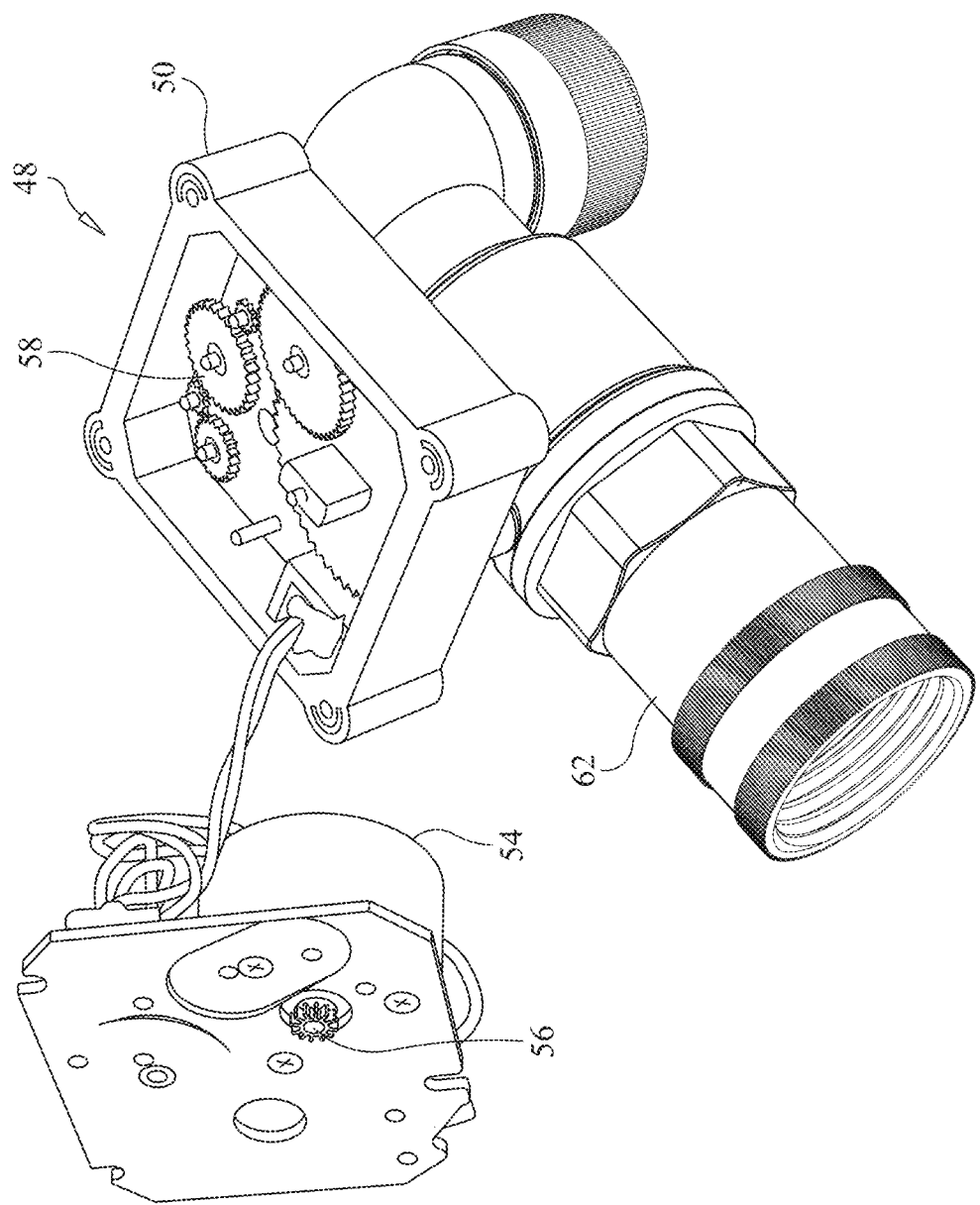
FIG. 8A is yet another perspective view of the ball valve and actuator portion thereof forming part of the system of the present invention, with the cover of the actuator portion removed to show the gearing, motor and other components of the actuator portion situated within the housing thereof.

However, for a hot water tank, the system 2 includes a manipulator unit 78 which is attachable to the existing valve 46 of the cold water supply to the tank, as shown in FIG. 8 of the drawings. The manipulator unit 78 is attachable to the handle 80 of the existing ball valve 46 and includes an internal motor 54 that rotates the handle 80 of the ball valve 46 by ninety degrees or whatever is required to open or close the valve 46, in the same way that a person would turn the handle 80 of the ball valve 46 to allow or prevent water from flowing through the valve 46. The manipulator unit 78 is also attachable to the valve 46 on the main water supply plumbing for the residence. The water leak sensor 10 may be situated on the floor 12 in proximity to where a leak may occur.

Figure 26:
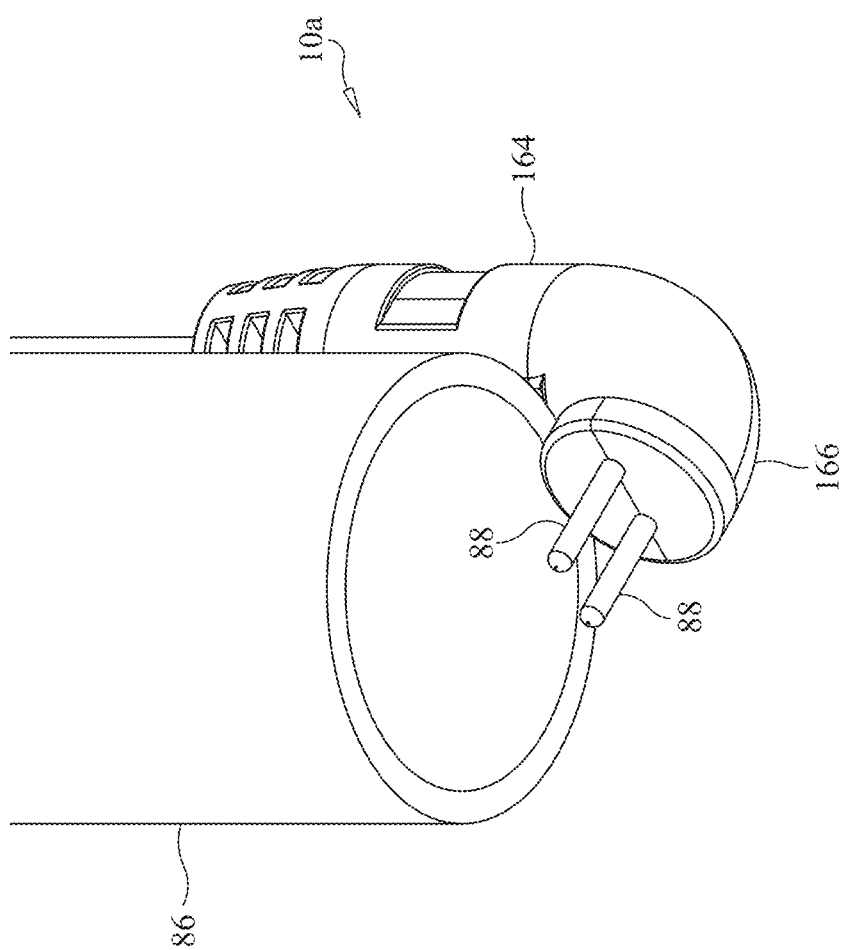
FIG. 26 is a perspective view of another form of a water leakage sensor forming part of the system of the present invention, and illustrating how the water leakage sensor may be mounted to the pressure relief output pipe of a water heater.

An alternative form of a water leak sensor 10*a*, constructed in accordance with the present invention, rather than the disc-shaped floor sensor 10, is shown in FIG. 26 of the drawings. This sensor 10*a* is mountable on the open free end of the conduit 86 extending downwardly from the pressure release valve of a hot water heater. The sensor 10*a* has a generally "L" shaped housing, with a first portion 164 that may be secured to the conduit 86 and a second portion 166 that is perpendicular to the first portion and from which two spaced apart electrical contacts 88 protrude and extend beneath the open end of the pressure release conduit 86. When water is dripping or flowing out the open end of the conduit 86, it will short the electrical contacts 88 together, the sensor 10*a* in response sending a signal via electrical wires to the control unit 8 that a leak has been detected.

Also, since the existing water valve 46 is used and the manipulator unit 78 is attached thereto and is controlled by the electronic circuitry 26 within the control unit 8, it is well known that such ball valves 46 may not have been moved or turned off for many years. Mineral deposits may have accumulated on the ball valve 46, making it difficult to turn.

The electronic circuitry 26 of the control unit 8 may be programmed to automatically turn the handle 80 of the ball valve 46 to a closed position periodically and then return it back to its original open position. This automatic function is programmed into the electronic circuitry 26 of the control unit 8 with a timer 82 forming part of the electronic circuitry 26 (and preferably forming part of the microcontroller 74) that will activate the manipulator unit 78 and exercise the ball valve 46 periodically to prevent the ball valve 46 from becoming "frozen" due to corrosion or mineral deposits. For example, the electronic circuitry 26 and the timer 82 thereof may cause the manipulator unit 78 to close and then reopen the existing ball valve 46 once every three months or six months, or periodically, as needed to exercise the ball valve 46.

The system 2 of the present invention for detecting a fluid leak and closing a fluid valve 14, 46 when a leak is detected will now be further described.

A system 2 for detecting a fluid leak and closing a fluid valve 46 in response thereto includes a control unit 8, the control unit 8 having an electronic circuit 26; a fluid leak sensor 10, the fluid leak sensor 10 being electrically connected to the electronic circuit 26 of the control unit 8; and a manipulator unit 78, the manipulator unit 78 being operatively coupled to the fluid valve 46. The fluid leak sensor 10 generates a fluid leak detection signal when the fluid leak sensor 10 detects a fluid leak. The electronic circuit 26 of the control unit 8 is responsive to the fluid leak detection signal and generates a control signal in response thereto. The manipulator unit 78 is responsive to the control signal generated by the electronic circuit 26 and causes the fluid valve 46 to close in response thereto. The fluid leak sensor 10 detects one of water, oil and the presence of gas.

The fluid valve 46 that is controlled by the manipulator unit 78 includes a handle 80 that at least partially rotates. The manipulator unit 78 is mechanically coupled to the handle 80 of the fluid valve 46. The manipulator unit 78 causes the handle 80 of the fluid valve 46 to at least partially rotate thereby causing the fluid valve 46 to close, in response to the control signal generated by the electronic circuit 26 of the control unit 8.

A preferred form of the manipulator unit 78 of the system 2 is shown in FIGS. 10-25 of the drawings. These figures also illustrate how the manipulator unit 78 may be attached to the ball valve 46 of the existing plumbing in a residence in which the system 2 is used and to manipulate the handle 80 of the ball valve 46. More specifically, the manipulator unit 78 includes a housing 90 which defines an internal cavity 92 in which is situated a motor 94 having a motor shaft 96, reduction gearing 98 coupled to the motor shaft 96 and a gearing shaft 100 that extends outwardly through an opening formed in the rear wall 102 of the housing 90. The gearing shaft 100 is attached to a planar lever arm 104 at one axial end 106 thereof. The opposite axial free end 108 of the lever arm 104 has two spaced apart pins 110 which extend perpendicularly from the level arm 104. As will be explained in greater detail, the handle 80 of the ball valve 46 is located between the two spaced apart pins 110 on the lever arm 104. An electrical connector 112 extends outwardly from the rear wall 102 of the housing 90 of the manipulator unit 74 by a wire 114. This connector 112 may be coupled to a mating connector that is wired to the control unit 8, which controls the operation of the manipulator unit 78 to cause the lever arm 104 and the handle 80 of the ball valve 46 to rotate at least partially in a clockwise and counterclockwise direction to open and close the valve 46.

The manipulator unit 78 comes with a number of components which are used to locate and secure the manipulator unit 78 to the ball valve 46. These components include a pair of mounting brackets 116, two different sized locator rings 118, an Allen or hex head screw 120 and flat washer 122, split or spring lock washers 124, flat washers 126, butterfly nuts 128, and several machine bolts 130. The steps of attaching the manipulator unit 78 to the ball valve 46 will now be described.

Figure 12:
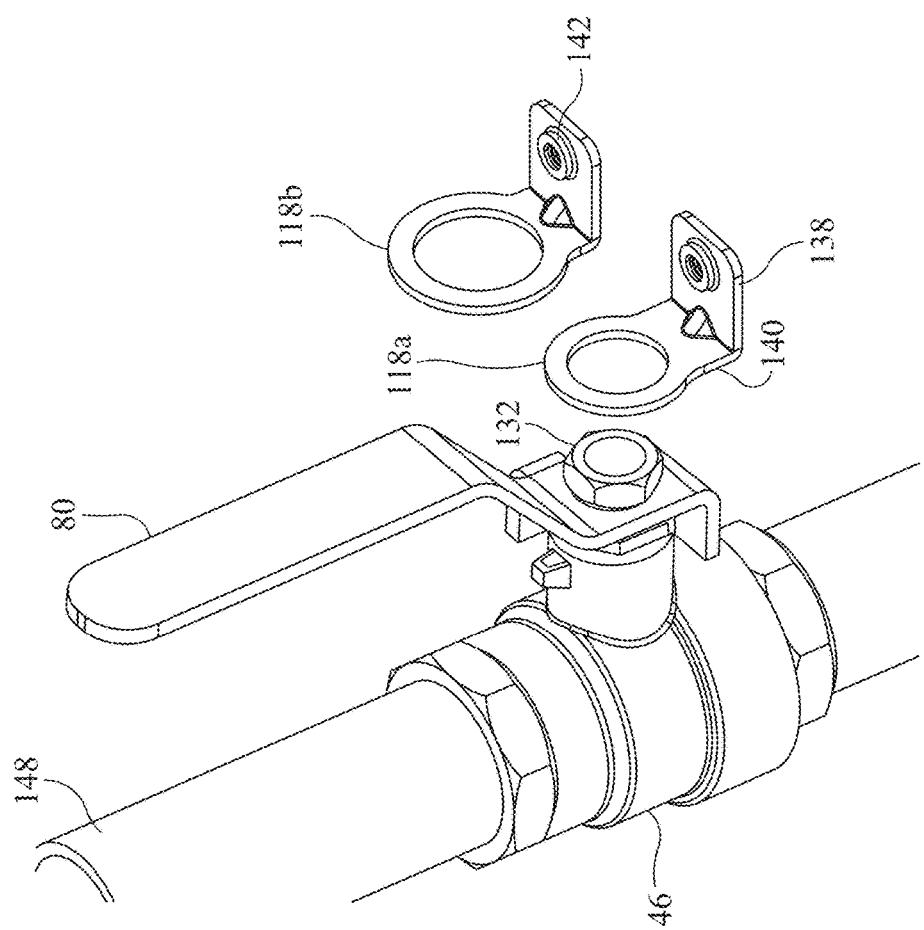
FIG. 12 is a perspective view of an existing ball valve of the plumbing in a residence in which the system is installed, and illustrating a first step for mounting the manipulator unit forming part of the system of the present invention on the existing ball valve and the components used to align the manipulator unit properly on the existing ball valve.
Figure 13:
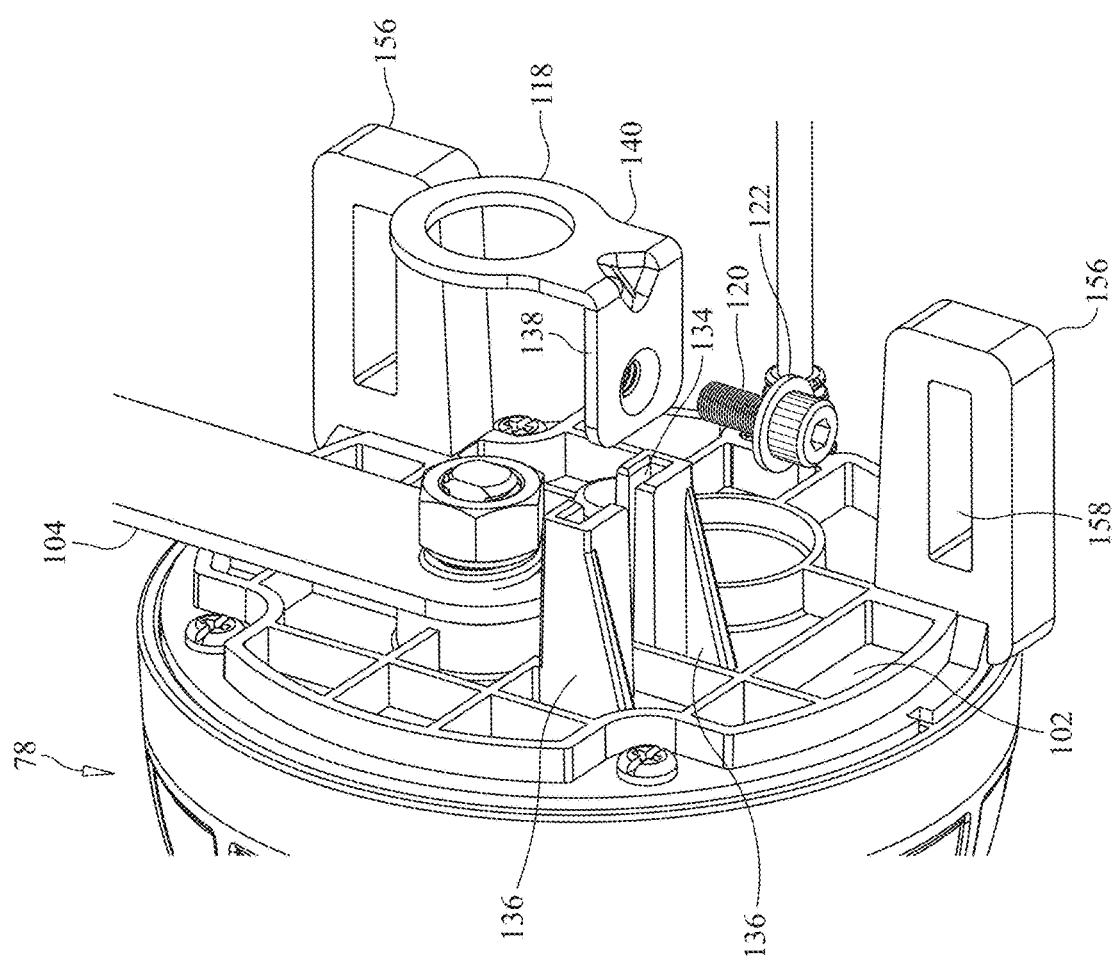
FIG. 13 is a perspective view of a portion of the manipulator unit forming part of the system of the present invention, and illustrating a second step for attaching the manipulator unit to the handle of an existing ball valve of the plumbing in a residence in which the system is installed.

First, the user or installer of the manipulator unit 78 of the system of the present invention should choose either the 15 millimeter diameter hole locating ring 118*a* or the 20 millimeter diameter hole locating ring 118*b* based on the size of the nut 132 attaching the handle 80 to the valve 46. The locator ring 118 selected by the user, based on the closest opening diameter that fits the outline of the valve handle nut 132, is then inserted into a slot 134 defined by and between two spaced apart, parallel posts 136 extending perpendicularly outwardly from the rear wall 102 of the housing 90 of the manipulator unit 78. More specifically, each locator ring 118 includes a tab 138 that extends perpendicularly from and is attached to the portion 140 of the ring in which the 15 millimeter diameter or 20 millimeter diameter opening is formed through the thickness thereof. This tab 138 is inserted into the slot 134 defined by the two outwardly extending posts 136 and is pushed in towards the rear wall 102 of the housing 90 of the manipulator unit 78 as far as possible. A hex screw 120, with its flat washer 122 mounted on the shaft thereof, is inserted into the slot 134 defined by the two posts 136 and into a tapping hole 142 formed in the tab 138 of the locator ring 118, with the washer 122 engaging side walls of the posts 136, to hold the locator ring 118 selected by the user in place on the rear wall 102 of the housing 90 of the manipulator unit 78. Such is shown in FIGS. 12 and 13 of the drawings.

Figure 14:
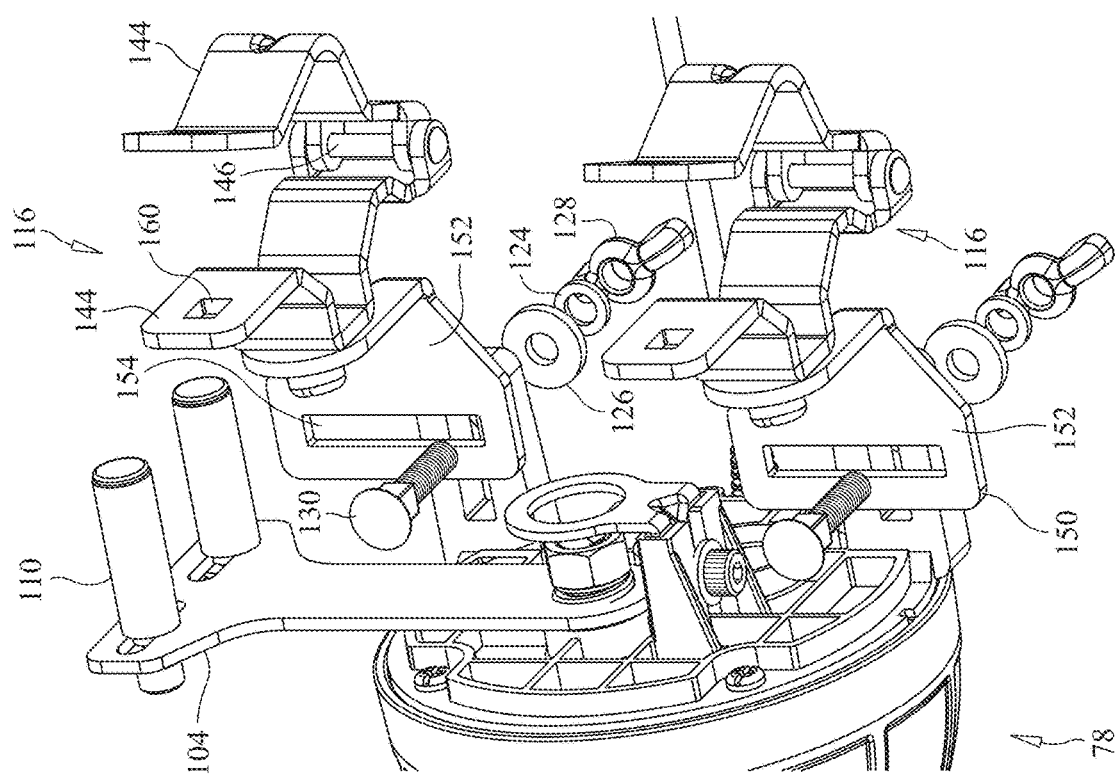
FIG. 14 is a perspective view of a portion of the manipulator unit forming part of the system of the present invention, and illustrating a third step for attaching the manipulator unit to the handle of an existing ball valve of the plumbing in a residence in which the system is installed.

Now, the two mounting brackets 116 are attached to the manipulator unit 78, as shown in FIG. 14 of the drawings. More specifically, each of the mounting brackets 116 includes a pair of generally V-shaped legs 144 which face one another, corresponding axial ends of the legs 144 being hingedly joined together by a pivot pin 146. The two legs 144 face one another in a mirror image so that the water supply pipe (or gas pipe) 148 may be inserted between the mutually outwardly extending V-portions of the pair of legs 144 of each mounting bracket 116.

As can be seen from FIG. 14 of the drawings, one leg 144 of each mounting bracket 116 includes an L-shaped flange 150 secured to it, one segment 152 of the L-shaped flange 150 having a slot 154 formed through the thickness thereof. Also, there are two diametrically opposed, spaced apart projection members 156 extending outwardly from the rear wall 102 of the housing 90 of the manipulator unit 78. Each projection member 156 includes a slot 158 formed through the thickness thereof.

A carriage bolt 130 is inserted through the slot 154 of the L-shaped flange 150 of each mounting bracket 116 and through the slot 154 of a respective projection member 156 extending outwardly from the housing 90 of the manipulator unit 78. A flat washer 126, split or spring washer 124 and butterfly nut 128 are inserted onto the shank of each carriage bolt 130. The butterfly nuts 128 are not tightened so that the mounting brackets 116 may be adjusted in their position with respect to the projection members 156 extending from the rear wall 102 of the housing 90 of the manipulator unit 78.

It should be noted that the elongated length of the slot 154 formed in the flange 152 of each mounting bracket 116 is disposed perpendicularly to the elongated length of the slot 158 of the respective projection member 156 to which it is attached by the carriage bolt 130. This feature provides greater maneuverability and adjustability in the X-Y plane for positioning the manipulator unit 78 in proper alignment with and attachment to the ball valve 46 and the pipe 148 connected to the valve 46.

Figure 15:
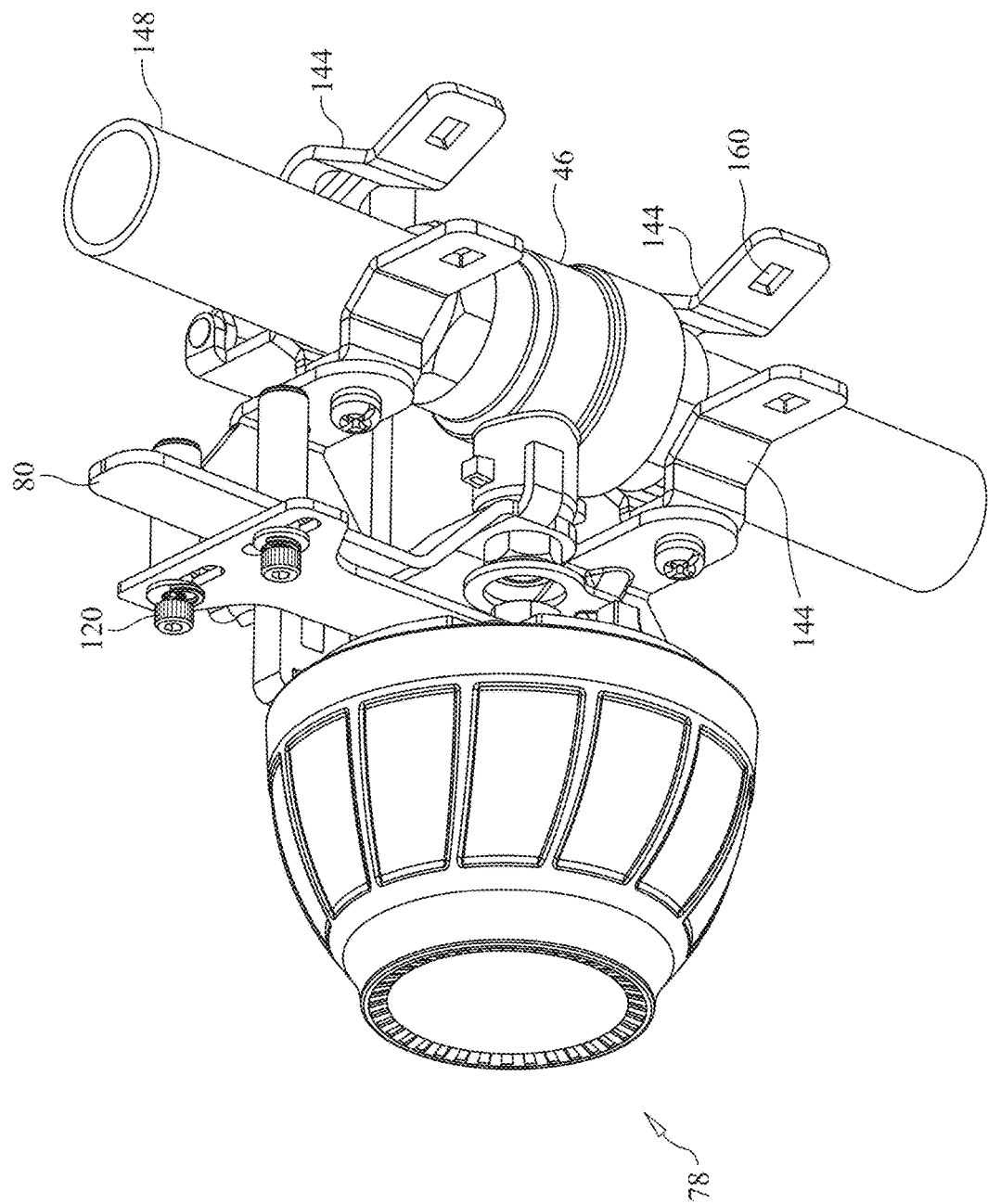
FIG. 15 is a perspective view of a portion of the manipulator unit forming part of the system of the present invention, and illustrating a fourth step for attaching the manipulator unit to the handle of an existing ball valve of the plumbing in a residence in which the system is installed.

Turning now to FIG. 15 of the drawings, it will be seen that the user should place the handle 80 of the ball valve 46 in the open position (which is in line with the water supply pipe 148). The manipulator unit 78 is then moved into position against the ball valve 46 such that the handle 80 of the ball valve 46 is placed between the pins 110 that extend perpendicularly from the axial free end 106 of the lever arm 104 of the manipulator unit 78. The pins 110 are adjustably mounted on the lever arm 104 in respective slots and secured in place by hex screws so that the spacing between the pins 110 may be adjusted to closely engage and receive therebetween the handle 80 of the ball valve 46. The opening in the locator ring 118 should be in alignment with the handle nut 132 of the water valve 46. The hex screw 120, which holds the locator ring 118 in place, may be loosened in order to adjust the locator ring 118 so that the ring opening is properly aligned with the handle nut 132 on the water valve 46. The screw 120 is then tightened once alignment between the opening of the locator ring 118 and the handle nut 132 is achieved.

Figure 16:
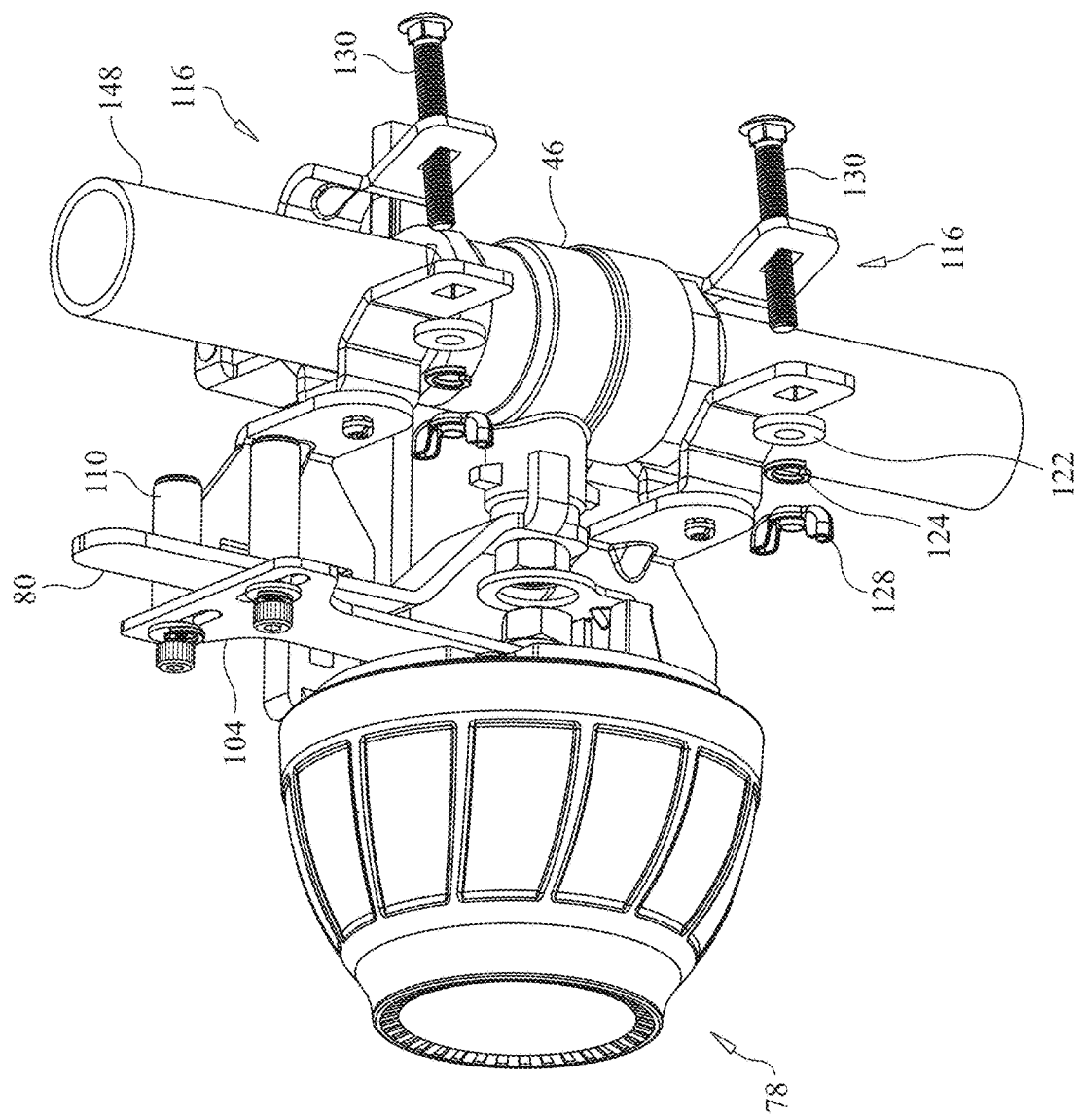
FIG. 16 is a perspective view of a portion of the manipulator unit forming part of the system of the present invention, and illustrating a fifth step for attaching the manipulator unit to the handle of an existing ball valve of the plumbing in a residence in which the system is installed.

As can be seen from FIG. 16 of the drawings, the two mounting brackets 116 are placed on the water supply pipe 148 on opposite axial sides of the in-line ball valve 46, with the pipe 148 extending between the V-portions of the legs 144 of each mounting bracket 116. Then, a carriage bolt 130 is inserted through openings 160 formed in the opposite free axial ends of the legs 144 of each mounting bracket 118, and a flat washer 122, a split or spring washer 124 and a butterfly nut 128 are mounted on the shank of each carriage bolt 130. At this stage in the assembly, the carriage bolts 130 should not be tightened completely.

Figure 17:
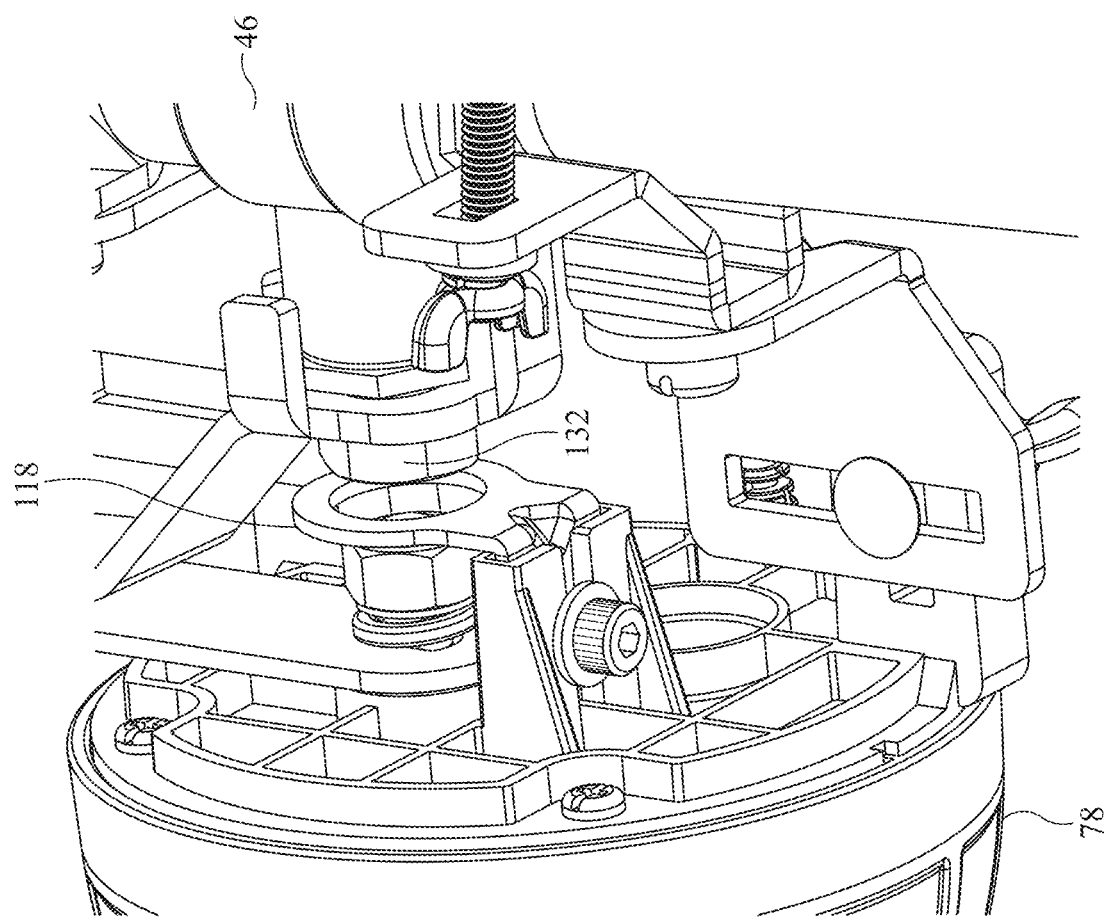
FIG. 17 is a perspective view of a portion of the manipulator unit forming part of the system of the present invention, and illustrating a sixth step for attaching the manipulator unit to the handle of an existing ball valve of the plumbing in a residence in which the system is installed.
Figure 18:
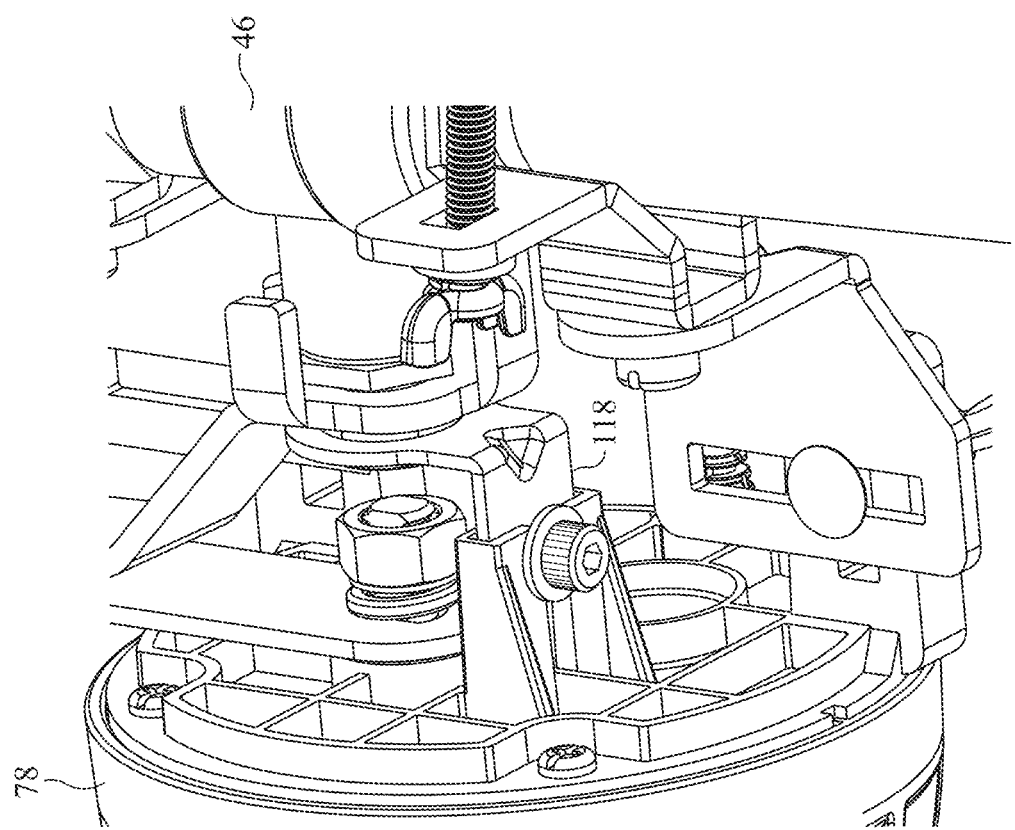
FIG. 18 is a perspective view of a portion of the manipulator unit forming part of the system of the present invention, and illustrating a seventh step for attaching the manipulator unit to the handle of an existing ball valve of the plumbing in a residence in which the system is installed.

Next, and as shown in FIG. 17 of the drawings, the manipulator unit 78 and the mounting brackets 116 should be adjusted relative to the water supply pipe 148 and ball valve 46 to insure that the opening in the locator ring 118 is in alignment with the nut 132 that holds the handle 80 onto the ball valve 46. The hex screw 120 is loosened to move the locator ring 118 outwardly from the rear wall 102 of the housing 90 of the manipulator unit 78 so that the nut 132 of the ball valve handle 80 is received by the opening formed in the locator ring 118. The hex screw 120 is then tightened to hold the locator ring 118 in place in this position, as shown in FIG. 18 of the drawings.

Figure 19:
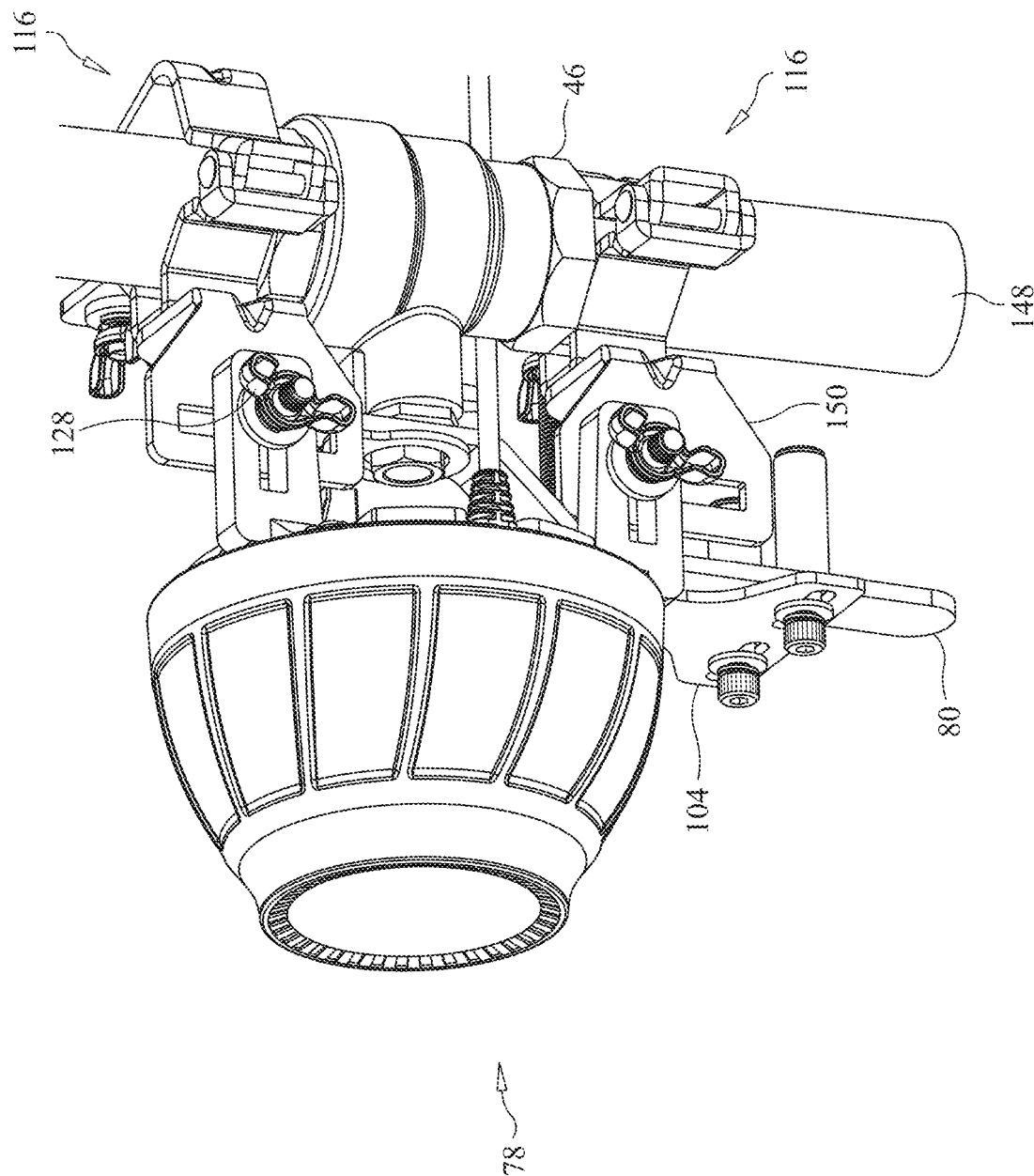
FIG. 19 is a perspective view of a portion of the manipulator unit forming part of the system of the present invention, and illustrating an eighth step for attaching the manipulator unit to the handle of an existing ball valve of the plumbing in a residence in which the system is installed.
Figure 20:
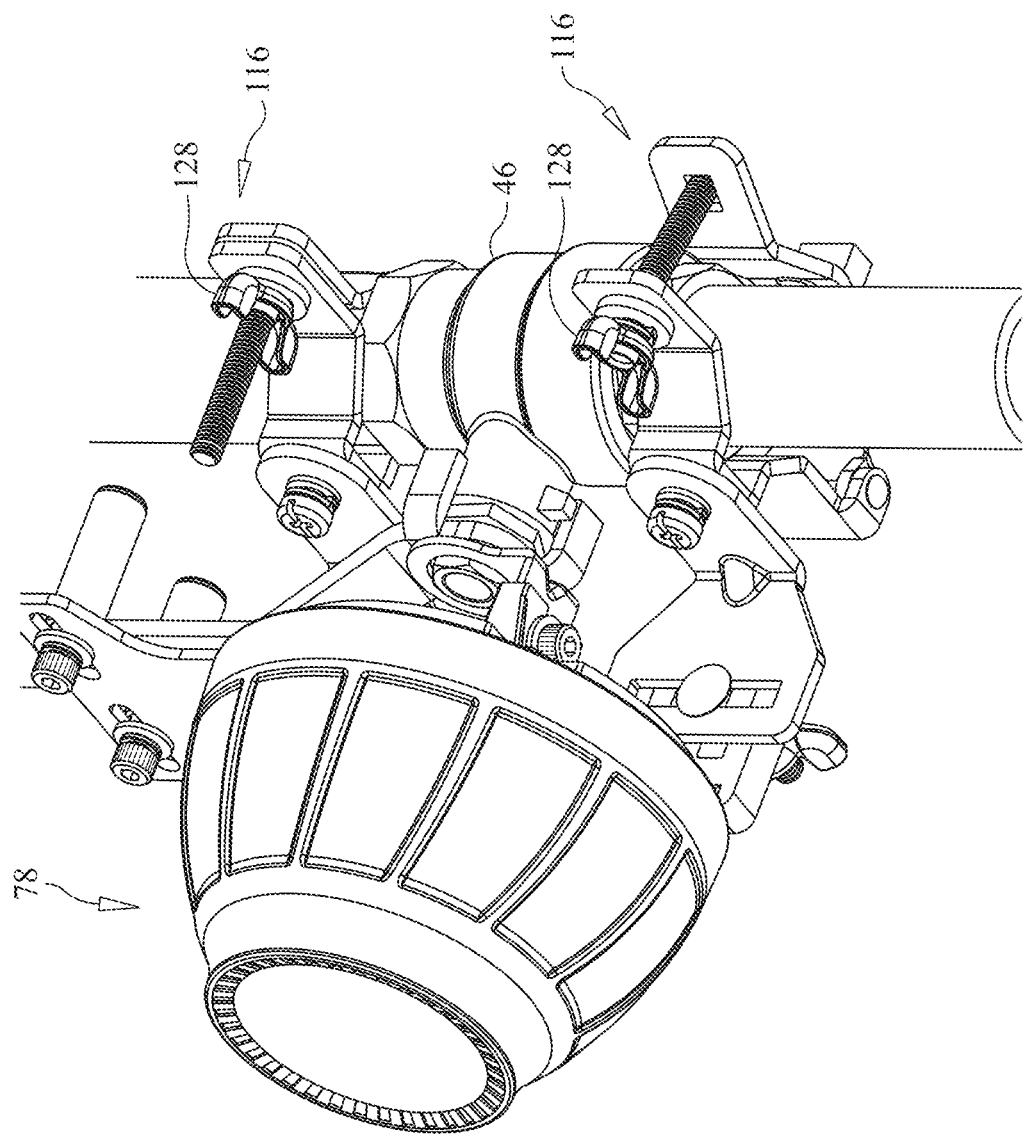
FIG. 20 is a perspective view of a portion of the manipulator unit forming part of the system of the present invention, and illustrating a ninth step for attaching the manipulator unit to the handle of an existing ball valve of the plumbing in a residence in which the system is installed.

Now, and as shown in FIGS. 19 and 20, the butterfly nuts 128 on the bolts 130 which hold the flange 150 of each mounting bracket 116 to the projection members 156 on the manipulator unit 78 are tightened, and then the two butterfly nuts 128 at the free ends of the mounting brackets 116 are tightened in order to secure the manipulator unit 78 in place on the water supply pipe 148.

Figure 21:
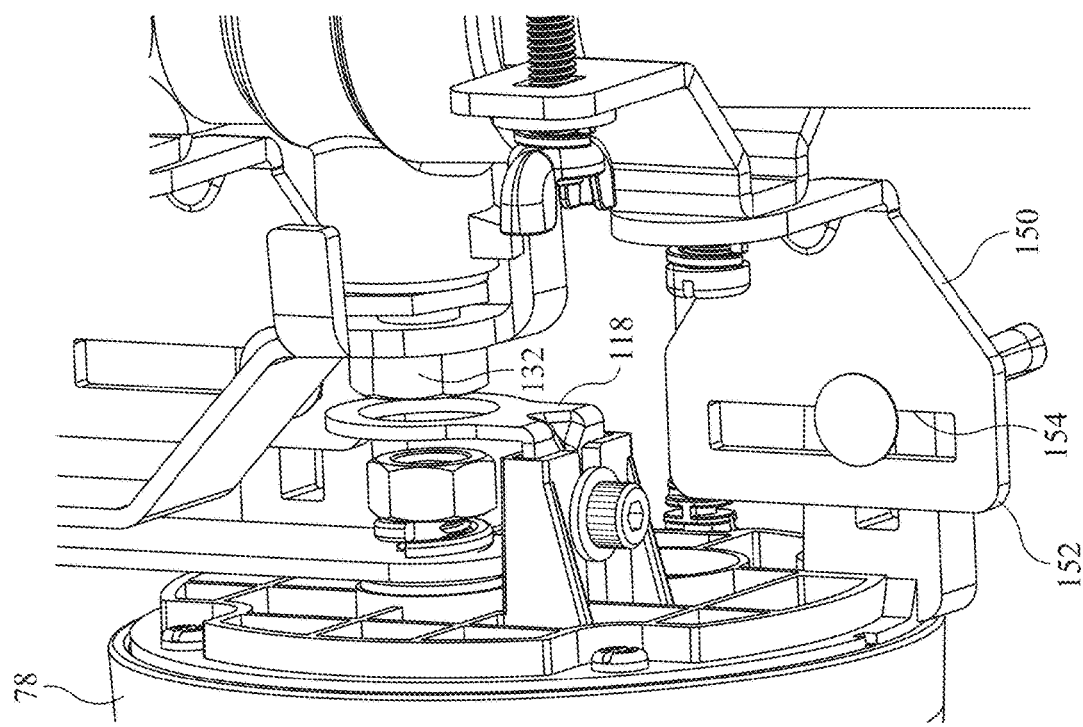
FIG. 21 is a perspective view of a portion of the manipulator unit forming part of the system of the present invention, and illustrating a tenth step for attaching the manipulator unit to the handle of an existing ball valve of the plumbing in a residence in which the system is installed.
Figure 22:
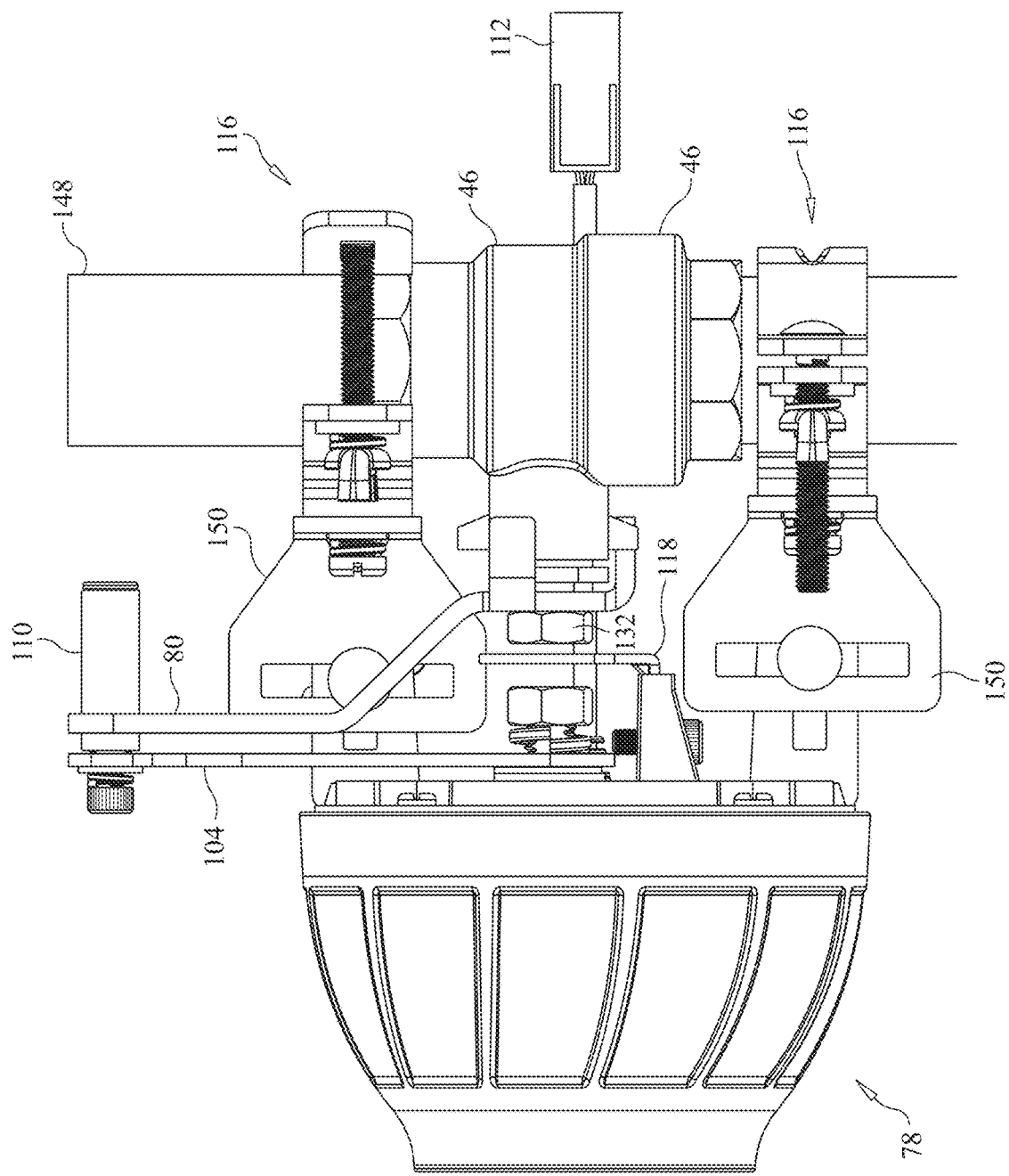
FIG. 22 is a perspective view of a portion of the manipulator unit forming part of the system of the present invention, and illustrating an eleventh step for attaching the manipulator unit to the handle of an existing ball valve of the plumbing in a residence in which the system is installed.
Figure 23:
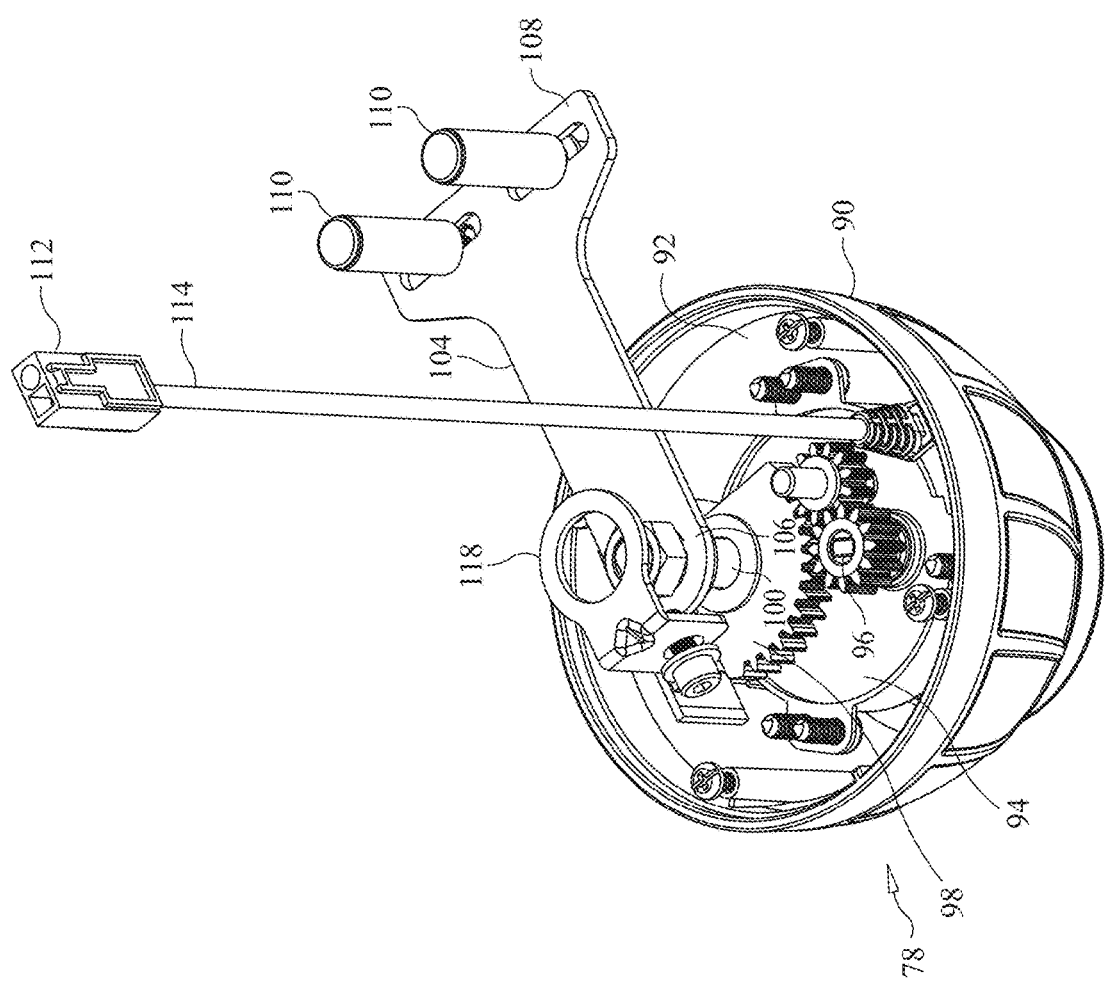
FIG. 23 is a perspective view of certain components of the manipulator unit forming part of the system of the present invention, with other components of the manipulator unit omitted therefrom to facilitate an understanding of the invention.
Figure 24:
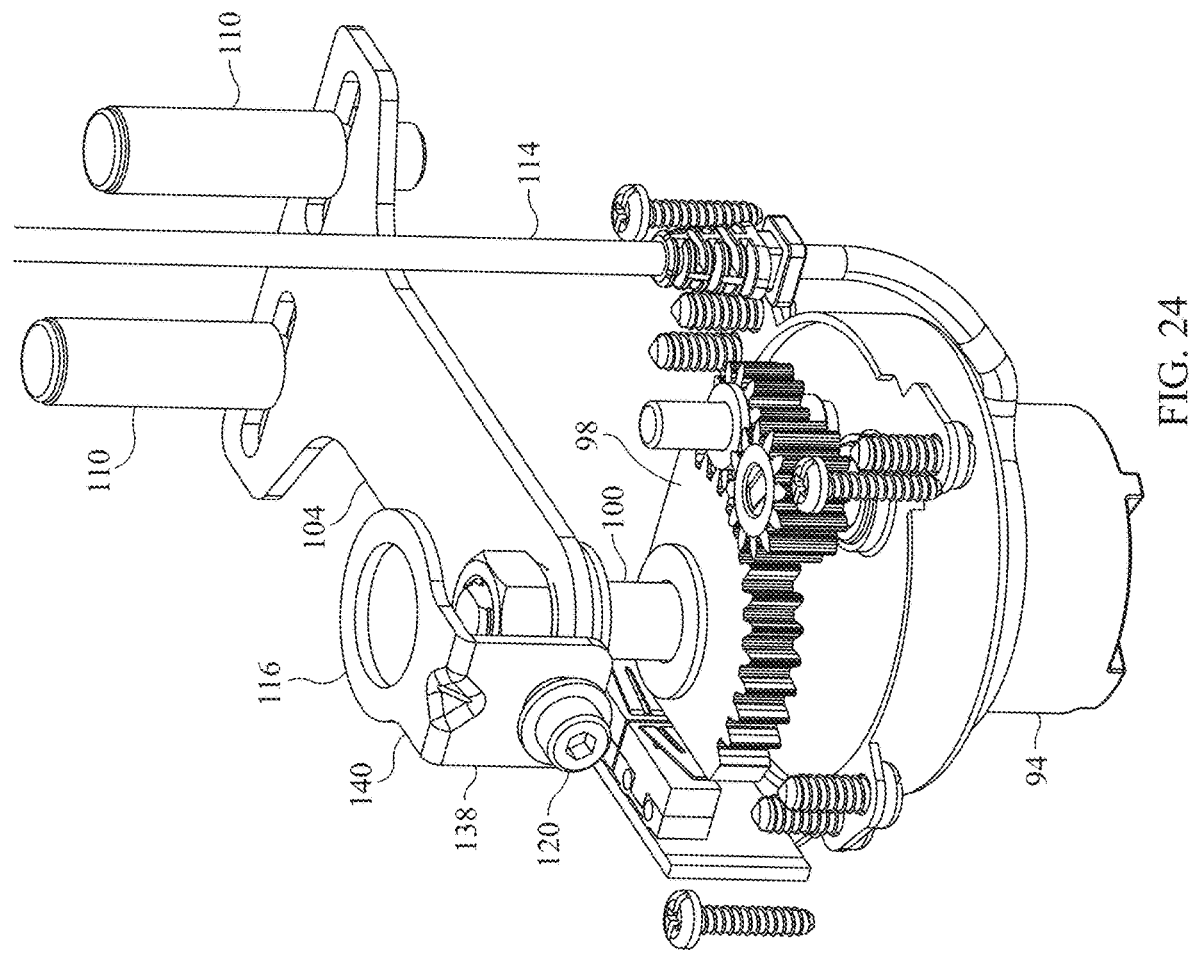
FIG. 24 is another perspective view of certain components of the manipulator unit forming part of the system of the present invention, with other components of the manipulator unit omitted therefrom to facilitate an understanding of the invention.
Figure 25:
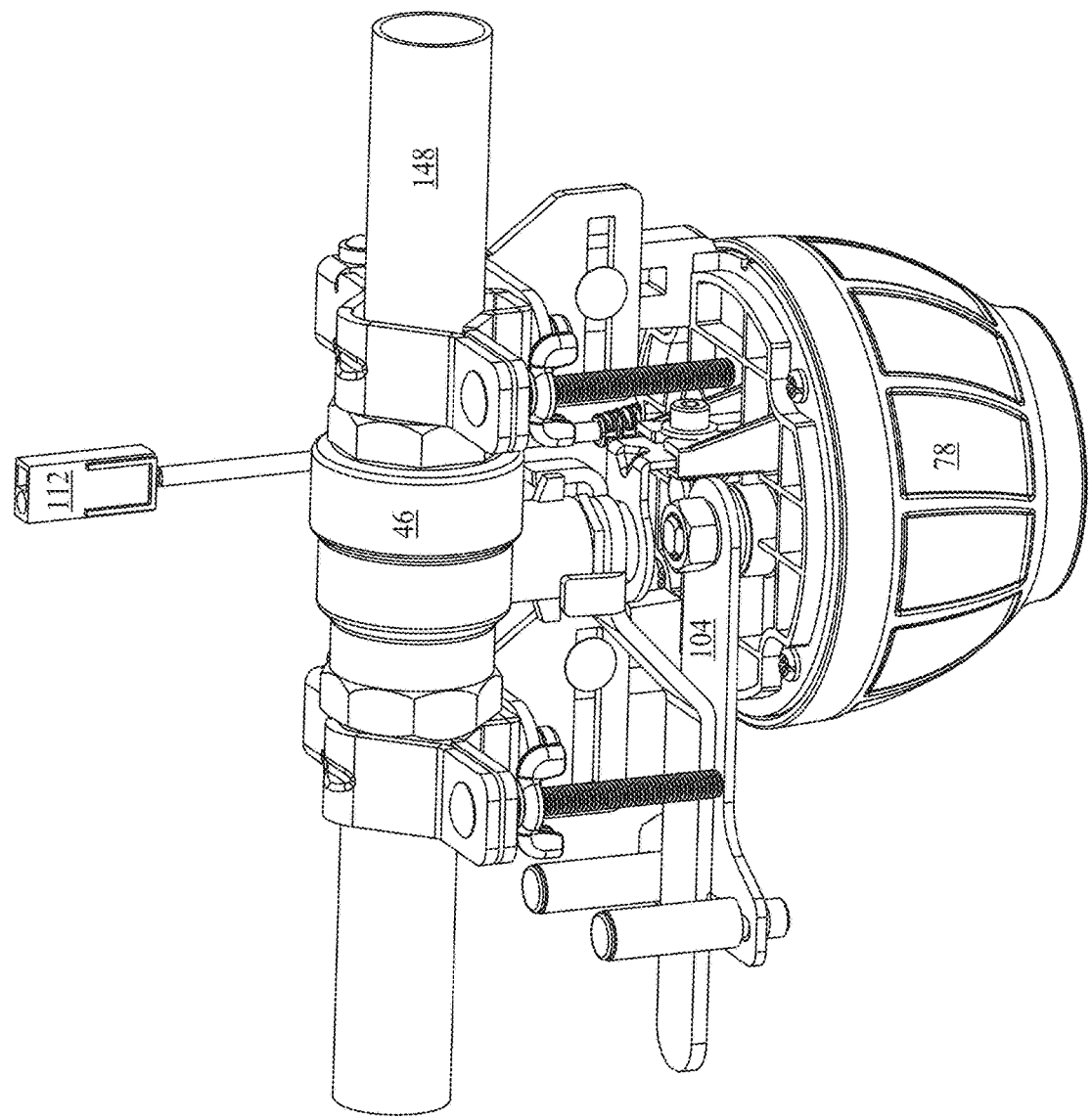
FIG. 25 is another perspective view of the manipulator unit forming part of the system of the present invention, which manipulator unit is attachable to the handle of an existing ball valve of the plumbing in a residence in which the system is installed.

Then, and as shown in FIGS. 21 and 22 of the drawings, the hex screw 120 that holds the locator ring 118 in place is loosened, and the locator ring 118 is pushed away from the nut 132 which holds the handle 80 onto the valve 46. The hex screw 120 is then tightened to hold the locator ring 118 in place, disengaged from the valve handle nut 132. The purpose is to avoid any possible resistance caused when the handle 80 of the ball valve 46 turns and rubs against the inner surface of the locator ring 118 which defines the opening. This also prevents the nut 132 from possibly loosening due to its engagement with the locator ring 118. Mounting of the manipulator unit 78 on the ball valve 46 is now complete. FIG. 23 shows the manipulator unit 78 properly secured to the ball valve 46.

The control unit includes a housing 24. The housing 24 defines an interior cavity in which the electronic circuit 26 is situated. The control unit 8 includes an alarm transducer 36 mounted on the housing 24 and being electrically connected to the electronic circuit 26, the alarm transducer 36 emitting an audible alarm in response to a fluid leak being detected by the fluid leak sensor 10.

Preferably, the control unit 8 includes a first indicator light 34. The first indicator light 34 is mounted on the housing 24 of the control unit 8 and is electrically connected to the electronic circuit 26 of the control unit 8. The first indicator light 34 is illuminated by the electronic circuit 26 when at least one of a) a fluid leak is detected by the fluid leak sensor 10, and b) the manipulator unit 78 has closed the fluid valve 46.

The control unit 8 may also include a second indicator light 34 (which may form part of the first indicator light 34), the second indicator light 34 being mounted on the housing 24 of the control unit 8 and being electrically connected to the electronic circuit 26 of the control unit 8. The second indicator light 34 is illuminated by the electronic circuit 26 when at least one of c) a fluid leak is not detected by the fluid leak sensor 10, and d) the manipulator unit 78 has not closed the fluid valve 46.

Preferably, the first indicator light 34 illuminates in a red color, and the second indicator light 34 illuminates in a green color. As mentioned previously, the first indicator light 34 and the second indicator light 34 together are formed as a red/green bi-color light emitting diode (LED).

Preferably, the control unit 8 includes a third indicator light 32. The third indicator light 32 is mounted on the housing 24 of the control unit 8 and is electrically connected to the electronic circuit 26 of the control unit 8. The third indicator light 32 is illuminated by the electronic circuit 26 when at least one of e) the manipulator unit 78 is in the process of closing the fluid valve 46, f) a test is performed on the electronic circuit 26 of the control unit 8, g) the electronic circuit 26 disables the alarm transducer 36 so that the alarm transducer 36 does not emit an audible alarm, and h) power is restored to the electronic circuit 26 after a loss of power. Preferably, the third indicator light 32 illuminates in a yellow color.

The control unit 8 preferably includes a switch 30. The switch 30 is mounted on the housing 24 of the control unit 8 and is electrically connected to the electronic circuit 26 of the control unit 8. The switch 30 is activatable, and when activated, causes the electronic circuit 26 to go into a vacation mode. The electronic circuit 26, when in the vacation mode, causes the manipulator unit 78 to cause the fluid valve 46 to close in the absence of a fluid leak detection signal from the fluid leak sensor 10.

Furthermore, the control unit 8 may include a switch 28. The switch 28 is mounted on the housing 24 of the control unit 8 and is electrically connected to the electronic circuit 26 of the control unit 8. The switch 28 is activatable, and when activated, causes the electronic circuit 26 to go into a test mode. The electronic circuit 26, when in the test mode, causes the manipulator unit 78 to cause the fluid valve 46 to close for a predetermined period of time in the absence of a fluid leak detection signal from the fluid leak sensor 10.

The electronic circuit 26 of the control unit 8 may include a timer circuit 82. The timer circuit 82 causes the electronic circuit 26 to periodically generate the control signal when no fluid leak is detected by the fluid leak sensor 10. The manipulator unit 78 causes the fluid valve 46 to close periodically in response to the control signal and in the absence of a fluid leak detection signal in order to exercise the fluid valve 46.

Also, the electronic circuit 26 of the control unit 8 may generate the control signal in the absence of a fluid leak detection signal from the fluid leak sensor 10 when power provided to the electronic circuit 26 is lost. When this happens, the manipulator unit 78 causes the fluid valve 46 to close in response to the control signal generated by the electronic circuit 26.

A preferred form of the electronic circuit 26 of the system 2 of the present invention includes a microcontroller 74; a power unit 16, the power unit 16 providing power to the microcontroller 74 and the manipulator unit 78; and an alarm transducer 36 electrically connected to the microcontroller 74 for emitting an audible alarm. The electronic circuit 26 also preferably includes a first switch 30 electrically connected to the microcontroller 74 for disabling the alarm transducer 36 from emitting the audible alarm; a second switch 28 electrically connected to the microcontroller 74 and provided for at least one of testing and resetting the electronic circuit 26 and system 2; and at least one indicator light 32, 34 electrically connected to the microcontroller 74 and illuminating to indicate a condition. That condition may relate to the state of the electronic circuit 26 and the system 2, whether the alarm transducer 36 is disabled, whether a leak has been detected by the fluid leak sensor 10, and other conditions.

Now, a system 2 constructed in accordance with the present invention and used to detect a water leak in an appliance, such as a clothes washer 6, or other device, such as a hot water heater, will now be further described. More specifically, the system detects a water leak in one of at least one water conduit 4 and an apparatus 6 connected to the at least one water conduit 4. The water leak detection system of the present invention includes a control unit 8, the control unit 8 having an electronic circuit 26; a water sensor 10, the water sensor 10 being electrically connected to the electronic circuit 26 of the control unit 8; and at least one ball valve and actuator unit 14, the at least one ball valve and actuator unit 14 being in fluid communication with at least one source of water 84 and the at least one water conduit 4, the at least one ball valve and actuator unit 14 being changeable between a first state in which water is prevented from flowing therethrough and a second state in which water is permitted to flow therethrough.

The water sensor 10 generates a water leak detection signal when the water leak sensor 10 detects a water leak. The electronic circuit 26 of the control unit 8 is responsive to the water leak detection signal and generates a control signal in response thereto. The at least one ball valve and actuator unit 14 is responsive to the control signal generated by the electronic circuit 26 and changes to the second state to prevent water from flowing therethrough and through the at least one water conduit 4 connected thereto in response to the control signal.

In an application where the system 2 can detect a water leak in a clothes washer 6 and close valves leading thereto, the at least one water conduit 4, in this example, includes a hot water conduit 4*a* and a cold water conduit 4*b*, each of the hot water conduit 4*a* and the cold water conduit 4*b* being connected to the apparatus 6. Also, in this example, the at least one source of water 84 includes a source of hot water 84*a* and a source of cold water 84*b*. Furthermore, for this example, the at least one ball valve and actuator unit 14 includes a hot water ball valve and actuator unit 14*a* and a cold water ball valve and actuator unit 14*b*. The hot water ball valve and actuator unit 14*a* is in fluid communication with the source of hot water 84*a* and the hot water conduit 4*a*, and the cold water ball valve and actuator unit 14*b* is in fluid communication with the source of cold water 84*b* and the cold water conduit 4*b*. Each of the hot water ball valve and actuator unit 14*a* and the cold water ball valve and actuator unit 14*b* is changeable between the first state in which water is prevented from flowing therethrough and the second state in which water is permitted to flow therethrough.

Preferably, the hot water ball valve and actuator unit 14*a* includes a housing 50, the housing 50 of the hot water ball valve and actuator unit 14*a* having an indication thereon that hot water selectively flows therethrough. Similarly, the cold water ball valve and actuator unit 14*b* includes a housing 50, the housing 50 of the cold water ball valve and actuator unit 14*b* having an indication thereon that cold water selectively flows therethrough. Preferably, the hot water indication of the hot water ball valve and actuator unit 14*a* includes the color red, and the cold water indication of the cold water ball valve and actuator unit 14*b* includes the color blue.

Figure 7:
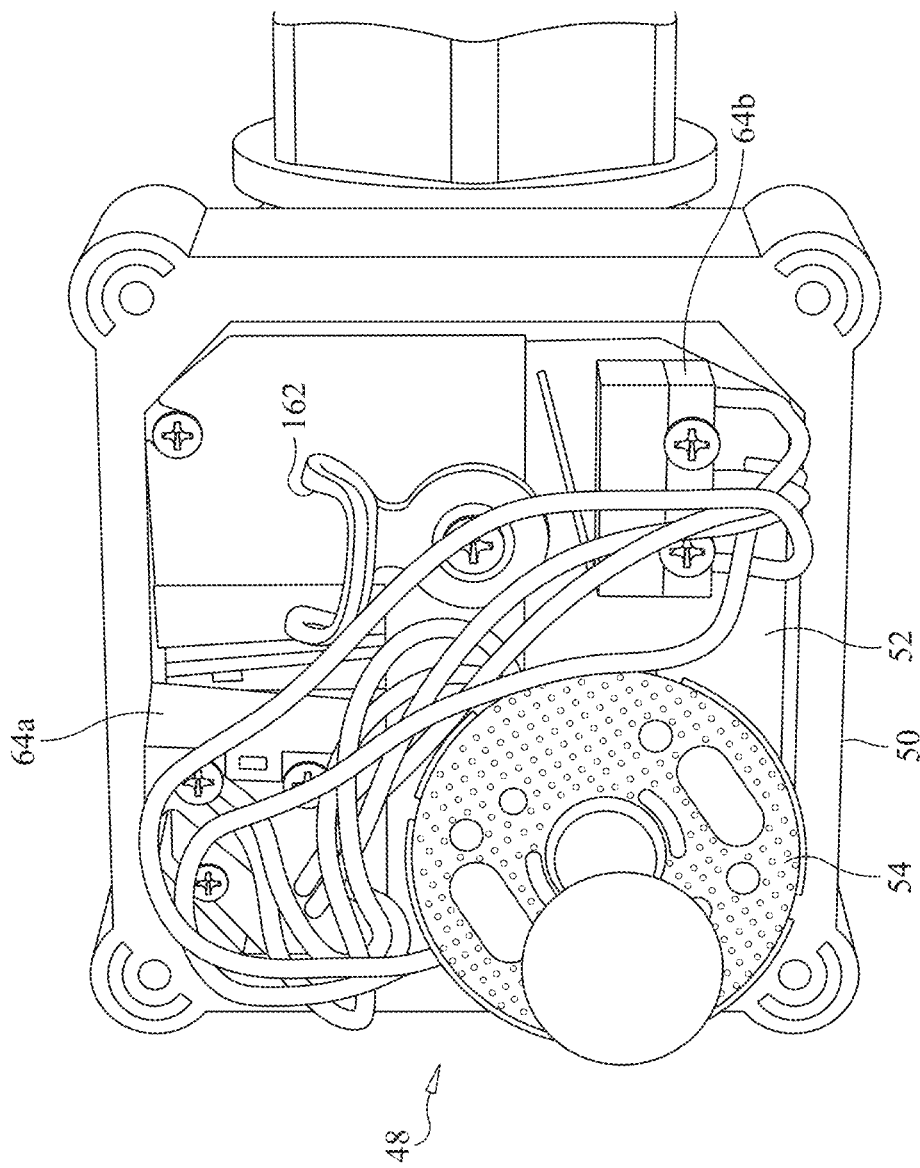
FIG. 7 is a perspective view of the actuator portion of the ball valve forming part of the system of the present invention, with the cover of the actuator portion removed to show the components of the actuator portion within the housing thereof.
Figure 9:
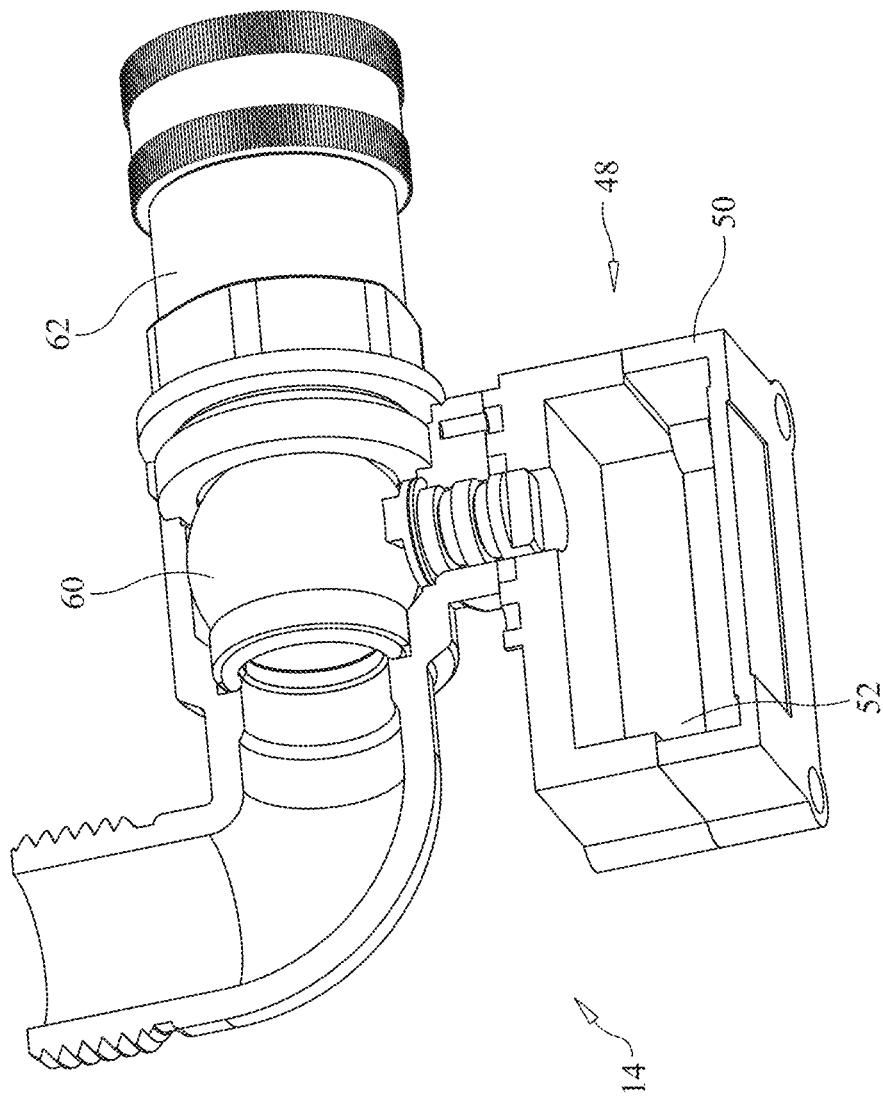
FIG. 9 is a perspective, partial cross-sectional view of the ball valve and actuator portion thereof forming part of the system of the present invention.
Figure 10:
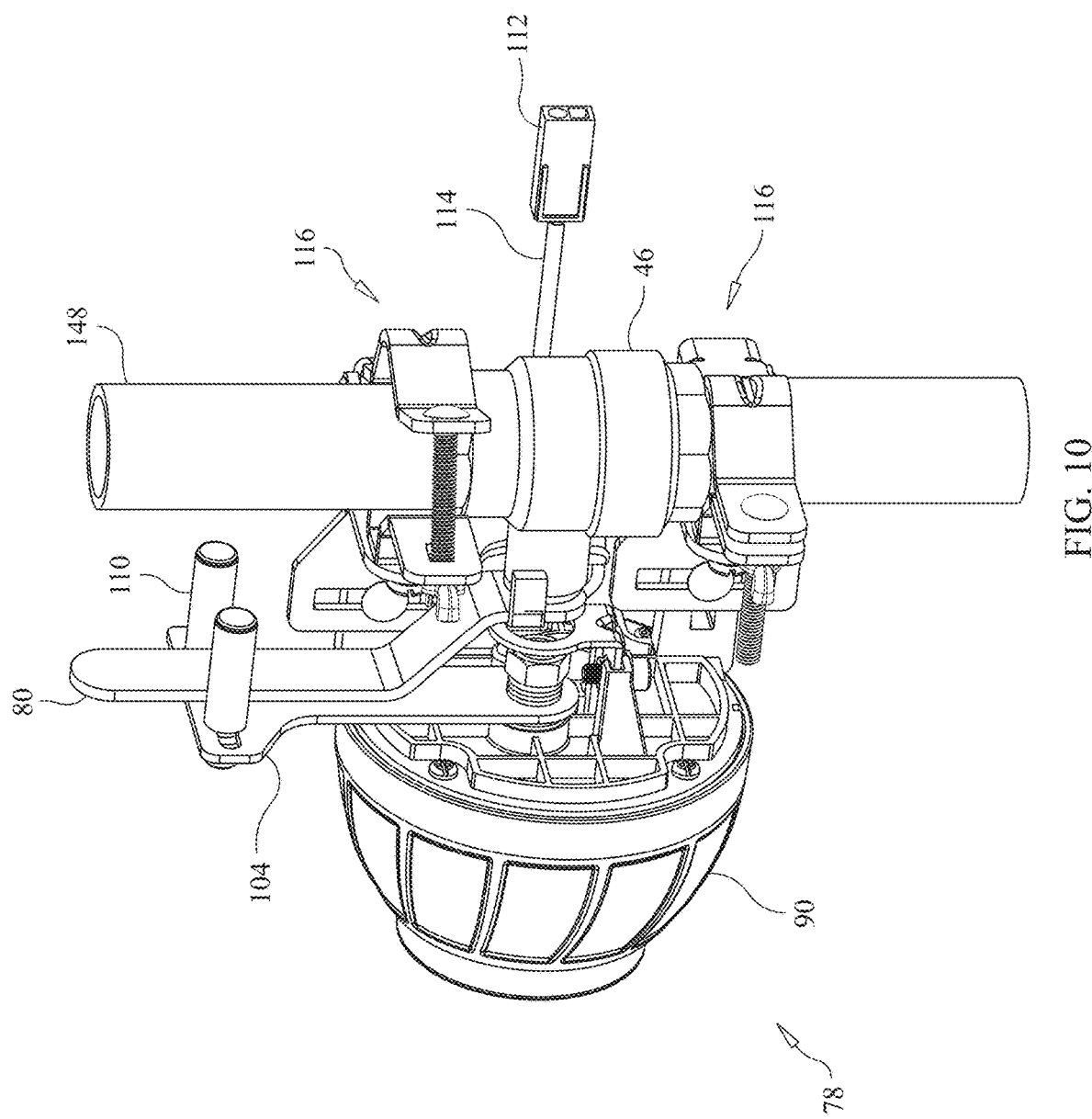
FIG. 10 is a perspective view of a manipulator unit forming part of the system of the present invention, which manipulator unit is attachable to the handle of an existing ball valve of the plumbing in a residence in which the system is installed.
Figure 11:
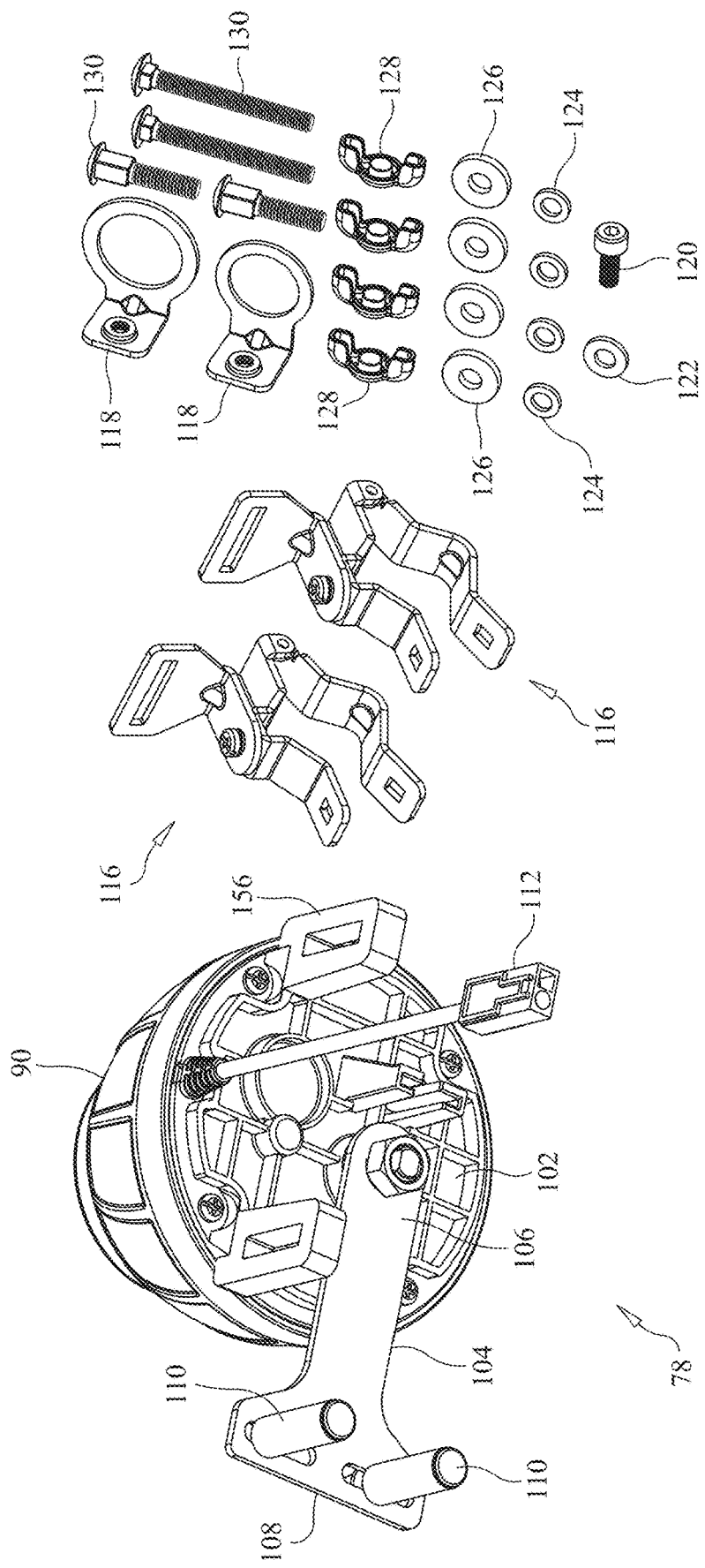
FIG. 11 is a perspective view of the manipulator unit and its associated components for attaching the manipulator unit to the handle of an existing ball valve of the plumbing in a residence in which the system of the present invention is installed.

Preferably, the at least one ball valve and actuator unit 14 includes a fitting 62. The fitting 62 is connectable to the at least one source of water 84 and to the at least one water conduit 4 such that the fitting 62 is fluidly interposed between the at least one source of water 84 and the at least one water conduit 4. The fitting 62 has a bore through which water selectively can flow. The at least one ball valve and actuator unit 14 further includes a ball valve 60 mounted on the fitting 62 in fluid communication with the bore of the fitting 62. The ball valve 60 is movable between the first state in which water is prevented from flowing through the bore of the fitting 62 and the second state in which water is permitted to flow through the bore of the fitting 62. As shown in FIGS. 7-9, an actuator housing 50 is mounted on the fitting 62. The actuator housing 50 defines an interior cavity. A motor 54 is situated within the actuator housing 50, the motor 54 having a motor shaft 56 which rotates. The motor 54 is energizable to cause the motor shaft 56 to rotate in a clockwise direction and a counterclockwise direction.

There is preferably also gearing 58 within the actuator housing 50. The gearing 58 is operatively coupled to the motor shaft 56, and to the ball valve 60. The motor 54, when energized, causes the gearing 58 to cause the ball valve 60 to change between the first state and the second state. It is preferred that reduction gearing 58 is used and coupled to the motor shaft 56 and the ball valve 60 in order to increase and provide the necessary torque to move the ball valve 60. Furthermore, the gearing 58 may be coupled to a control arm 162, which pivots to contact a first limit switch 64*a* and a second limit switch 64*b*, which operatively deenergize the motor 54 when the actuator unit 14 has fully opened or closed the ball valve 60 and the valve 60 and gearing 58 have reached their limit in a clockwise or counterclockwise direction.

It should be noted that the motor 54 of the at least one ball valve and actuator unit 14 may be a stepper motor and the control signal generated by the electronic circuit 26 is a digitally coded signal. The stepper motor causes the motor shaft 56 thereof to rotate in response to the digitally coded signal.

In the system 2 for detecting a water leak as described above, the control unit 8 includes a housing 24, the housing 24 defining an interior cavity in which the electronic circuit 26 is situated. Preferably, the control unit 8 includes an alarm transducer 36 mounted on the housing 24 and electrically connected to the electronic circuit 26. The alarm transducer 36 emits an audible alarm in response to a water leak being detected by the water leak sensor 10.

Additionally, the control unit 8 includes a first indicator light 34, the first indicator light 34 being mounted on the housing 24 of the control unit 8 and being electrically connected to the electronic circuit 26 of the control unit 8. The first indicator light 34 is illuminated by the electronic circuit 26 when at least one of a) a water leak is detected by the water leak sensor 10, and b) the at least one ball valve and actuator unit 14 is in the first state in which water is prevented from flowing therethrough.

Furthermore, the control unit 8 may include a second indicator light 34, the second indicator light 34 being mounted on the housing 24 of the control unit 8 and being electrically connected to the electronic circuit 26 of the control unit 8. The second indicator light 34 is illuminated by the electronic circuit 26 when at least one of c) a water leak is not detected by the water leak sensor 10, and d) the at least one ball valve and actuator unit 14 is not in the first state.

Preferably, the first indicator light 34 illuminates in a red color, and the second indicator light 34 illuminates in a green color. Furthermore, the first indicator light 34 and the second indicator light 34 may be formed together as a red/green bi-color light emitting diode (LED).

Even more preferably, the control unit 8 of the system 2 of the present invention includes a third indicator light 32, the third indicator light 32 being mounted on the housing 24 of the control unit 8 and being electrically connected to the electronic circuit 26 of the control unit 8. The third indicator light 32 is illuminated by the electronic circuit 26 when at least one of e) the at least one ball valve and actuator unit 14 is in the process of changing from the second state to the first state, f) a test is performed on the electronic circuit 26 of the control unit 8, g) the electronic circuit 26 disables the alarm transducer 36 so that the alarm transducer 36 does not emit an audible alarm, and h) power is restored to the electronic circuit 26 after a loss of power. Preferably, the third indicator light 32 illuminates in a yellow color.

The control unit 8 may also include a switch 30, the switch 30 being mounted on the housing 24 of the control unit 8 and being electrically connected to the electronic circuit 26 of the control unit 8. The switch 30 is activatable by a user of the system 2, and when activated, causes the electronic circuit 26 to go into a vacation mode. The electronic circuit 26, when in the vacation mode, causes the at least one ball valve and actuator unit 14 to change to the first state in which water is prevented from flowing therethrough in the absence of a water leak detection signal from the water leak sensor 10.

The control unit 8 may further include a switch 28, the switch 28 being mounted on the housing 24 of the control unit 8 and being electrically connected to the electronic circuit 26 of the control unit 8. The switch 28 is activatable by a user of the system 2, and when activated, causes the electronic circuit 26 to go into a test mode. The electronic circuit 26, when in the test mode, causes the at least one ball valve and actuator unit 14 to change to the first state in which water is prevented from flowing therethrough for a predetermined period of time in the absence of a water leak detection signal from the water leak sensor 10.

Preferably, the electronic circuit 26 of the control unit 8 includes a timer circuit 82. The timer circuit 82 causes the electronic circuit 26 to periodically generate the control signal when no water leak is detected by the water leak sensor 10. When this happens, the at least one ball valve and actuator unit 14 periodically changes from the second state to the first state in which water is prevented from flowing therethrough in response to the control signal and in the absence of a water leak detection signal in order to exercise the at least one ball valve and actuator unit 14.

The electronic circuit 26 of the control unit 8 may generate the control signal in the absence of a water leak detection signal from the water leak sensor 10 when power provided to the electronic circuit 26 is lost. When this occurs, the at least one ball valve and actuator unit 14 changes to the first state in which water is prevented from flowing therethrough in response to the control signal generated by the electronic circuit 26.

The electronic circuit 26 of the system 2 of the present invention for detecting a water leak preferably includes a microcontroller 74; a power unit 16, the power unit 16 providing power to the microcontroller 74 and the at least one ball valve and actuator unit 14; and an alarm transducer 36 electrically connected to the microcontroller 74 for emitting an audible alarm.

The electronic circuit 26 also preferably includes a first switch 30 electrically connected to the microcontroller 74 for disabling the alarm transducer 36 from emitting the audible alarm; a second switch 28 electrically connected to the microcontroller 74 and provided for at least one of testing and resetting the electronic circuit 26 and system 2; and at least one indicator light 32, 34 electrically connected to the microcontroller 74 and illuminating to indicate a condition, such as the state of the electronic circuit 26, at least one ball valve and actuator unit 14, whether a water leak has been detected by the water leak sensor 10, and other conditions.

As mentioned previously, the system 2 of the present invention may be used to sense a gas leak or the presence of carbon monoxide, sound the alarm 36 and shut off an existing oil or gas valve 46 in plumbing coming into the premises or connected to an oil or gas burner. The manipulator unit 78 may be attached to the gas or oil cutoff valve 46, and the sensor 10 may be one that detects a gas leak or the presence of carbon monoxide. When gas or carbon monoxide is detected by the sensor 10, the sensor 10 sends a signal to the electronic circuit 26 in the control unit 8 which, in turn, will send a control signal to the manipulator unit 78 to close the gas or oil cutoff valve 46.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A system for detecting a fluid leak and closing a fluid valve in response thereto, the fluid valve having a handle that at least partially rotates, the system comprising:
    a control unit, the control unit having an electronic circuit;
    a fluid leak sensor, the fluid leak sensor being electrically connected to the electronic circuit of the control unit; and
    a manipulator unit, the manipulator unit being operatively coupleable to the fluid valve;
    wherein the fluid leak sensor generates a fluid leak detection signal when the fluid leak sensor detects a fluid leak;
    wherein the electronic circuit of the control unit is responsive to the fluid leak detection signal and generates a control signal in response thereto;
    wherein the manipulator unit is responsive to the control signal generated by the electronic circuit and causes the fluid valve to close in response thereto when the manipulator unit is operatively coupled to the fluid valve;
    wherein the manipulator unit is mechanically coupled to the handle of the fluid valve, the manipulator unit causing the handle of the fluid valve to at least partially rotate thereby causing the fluid valve to close, in response to the control signal generated by the electronic circuit of the control unit;
    wherein the manipulator unit includes:
       a housing, the housing defining an interior cavity;
       a motor situated within the manipulator unit housing, the motor having a motor shaft which rotates, the motor being energizable to cause the motor shaft to rotate in a clockwise direction and a counterclockwise direction;
       gearing operatively coupled to the motor shaft; and
       a lever arm, the lever arm being operatively coupled to the gearing;
    wherein the motor, when energized, causes the gearing to cause the lever arm to move between a first position and a second position;
    wherein, movement of the lever arm from the first position to the second position causes the handle of the fluid valve to at least partially rotate to cause the fluid valve to close;
    wherein the lever arm is an elongated member having a first axial end and a second axial end situated opposite the first axial end;
    wherein the first axial end of the lever arm is operatively coupled to the gearing;
    wherein the second axial end of the lever arm is operatively coupleable to the handle of the fluid valve;
    wherein the lever arm includes a pair of spaced apart pins mounted on the second axial end thereof, the spaced apart pins defining a space therebetween;
    wherein at least a portion of the handle of the fluid valve is receivable within the space defined by the spaced apart pins;
    wherein at least one pin of the pair of pins is adjustably mounted on the second axial end of the lever arm to adjust the width of the space defined by and between the pair of pins between which the at least portion of the handle of the fluid valve is receivable; and
    wherein the at least one pin is adjustably mounted in a slot formed in the lever arm, the at least one pin being adjustable in its position within the slot so that the width of the space between the pair of pins is adjustable and so that the pair of pins may closely engage and receive between them the at least portion of the handle of the fluid valve.

2. A system for detecting a fluid leak as defined by claim 1, wherein the fluid leak sensor detects one of water, oil and the presence of gas.

3. A system for detecting a fluid leak as defined by claim 1, wherein the fluid valve to which the manipulator unit is operatively coupleable includes a nut securing the handle to the fluid valve; and
    wherein the manipulator unit includes a locator ring, the locator ring having an opening formed through the thickness thereof, the handle nut of the fluid valve being receivable by the opening in the locator ring to align the manipulator unit with the fluid valve when the manipulator unit is operatively coupled thereto.

4. A system for detecting a fluid leak as defined by claim 1, wherein the control unit includes a housing, the housing defining an interior cavity in which the electronic circuit is situated; and
    wherein the control unit includes an alarm transducer mounted on the housing and being electrically connected to the electronic circuit, the alarm transducer emitting an audible alarm in response to a fluid leak being detected by the fluid leak sensor.

5. A system for detecting a fluid leak as defined by claim 4, wherein the control unit includes a first indicator light, the first indicator light being mounted on the housing of the control unit and being electrically connected to the electronic circuit of the control unit, the first indicator light being illuminated by the electronic circuit when at least one of a) a fluid leak is detected by the fluid leak sensor, and b) the manipulator unit has closed the fluid valve.

6. A system for detecting a fluid leak as defined by claim 5, wherein the control unit includes a second indicator light, the second indicator light being mounted on the housing of the control unit and being electrically connected to the electronic circuit of the control unit, the second indicator light being illuminated by the electronic circuit when at least one of c) a fluid leak is not detected by the fluid leak sensor, and d) the manipulator unit has not closed the fluid valve.

7. A system for detecting a fluid leak as defined by claim 6, wherein the first indicator light illuminates in a red color; and wherein the second indicator light illuminates in a green color.

8. A system for detecting a fluid leak as defined by claim 7, wherein the first indicator light and the second indicator light together are formed as a red/green bi-color light emitting diode (LED).

9. A system for detecting a fluid leak as defined by claim 6, wherein the control unit includes a third indicator light, the third indicator light being mounted on the housing of the control unit and being electrically connected to the electronic circuit of the control unit, the third indicator light being illuminated by the electronic circuit when at least one of e) the manipulator unit is in the process of closing the fluid valve, f) a test is performed on the electronic circuit of the control unit, g) the electronic circuit disables the alarm transducer so that the alarm transducer does not emit an audible alarm, and h) power is restored to the electronic circuit after a loss of power.

10. A system for detecting a fluid leak as defined by claim 9, wherein the third indicator light illuminates in a yellow color.

11. A system for detecting a fluid leak as defined by claim 1, wherein the control unit includes a housing, the housing defining an interior cavity in which the electronic circuit is situated; and wherein the control unit includes a first switch, the first switch being mounted on the housing of the control unit and being electrically connected to the electronic circuit of the control unit, the first switch being activatable, and when activated, causes the electronic circuit to go into a vacation mode, the electronic circuit, when in the vacation mode, causing the manipulator unit to cause the fluid valve to close in the absence of a fluid leak detection signal from the fluid leak sensor.

12. A system for detecting a fluid leak as defined by claim 11, wherein the control unit includes a second switch, the second switch being mounted on the housing of the control unit and being electrically connected to the electronic circuit of the control unit, the second switch being activatable, and when activated, causing the electronic circuit to go into a test mode, the electronic circuit, when in the test mode, causing the manipulator unit to cause the fluid valve to close for a predetermined period of time in the absence of a fluid leak detection signal from the fluid leak sensor.

13. A system for detecting a fluid leak as defined by claim 11, wherein the electronic circuit of the control unit includes a timer circuit, the timer circuit causing the electronic circuit to periodically generate the control signal when no fluid leak is detected by the fluid leak sensor, the manipulator unit causing the fluid valve to close periodically in response to the control signal and in the absence of a fluid leak detection signal in order to exercise the fluid valve.

14. A system for detecting a fluid leak as defined by claim 11, wherein the electronic circuit of the control unit generates the control signal in the absence of a fluid leak detection signal from the fluid leak sensor when power provided to the electronic circuit is lost, the manipulator unit causing the fluid valve to close in response to the control signal generated by the electronic circuit.

15. A system for detecting a fluid leak as defined by claim 1, wherein the control unit includes a housing, the housing defining an interior cavity in which the electronic circuit is situated; and wherein the control unit includes an alarm transducer mounted on the housing and being electrically connected to the electronic circuit, the alarm transducer emitting an audible alarm in response to a fluid leak being detected by the fluid leak sensor.

16. A system for detecting a fluid leak and closing a fluid valve in response thereto, the fluid valve having a handle that at least partially rotates and a nut for securing the handle, the system comprising:

a control unit, the control unit having an electronic circuit;

a fluid leak sensor, the fluid leak sensor being electrically connected to the electronic circuit of the control unit; and a manipulator unit, the manipulator unit being operatively coupleable to the fluid valve;

wherein the fluid leak sensor generates a fluid leak detection signal when the fluid leak sensor detects a fluid leak;

wherein the electronic circuit of the control unit is responsive to the fluid leak detection signal and generates a control signal in response thereto;

wherein the manipulator unit is responsive to the control signal generated by the electronic circuit and causes the fluid valve to close in response thereto when the manipulator unit is operatively coupled to the fluid valve;

wherein the manipulator unit is mechanically coupled to the handle of the fluid valve, the manipulator unit causing the handle of the fluid valve to at least partially rotate thereby causing the fluid valve to close, in response to the control signal generated by the electronic circuit of the control unit;

wherein the manipulator unit includes:

a housing, the housing defining an interior cavity;

a motor situated within the manipulator unit housing, the motor having a motor shaft which rotates, the motor being energizable to cause the motor shaft to rotate in a clockwise direction and a counterclockwise direction;

gearing operatively coupled to the motor shaft; and a lever arm, the lever arm being operatively coupled to the gearing;

wherein the motor, when energized, causes the gearing to cause the lever arm to move between a first position and a second position;

wherein, movement of the lever arm from the first position to the second position causes the handle of the fluid valve to at least partially rotate to cause the fluid valve to close;

wherein the housing of the manipulator unit includes a rear wall;

wherein the manipulator unit includes a pair of spaced apart posts mounted on the rear wall and extending outwardly therefrom, the posts defining a slot therebetween; and wherein the manipulator unit includes a locator ring, the locator ring having a first portion and a second portion joined to the first portion, and having an opening formed through the thickness of the second portion thereof, the handle nut of the fluid valve being receivable by the opening in the locator ring to align the manipulator unit with the fluid valve when the manipulator unit is operatively coupled thereto, the first portion of the locator ring being receivable in the slot defined by and between the posts.

17. A system for detecting a fluid leak as defined by claim 16, wherein the first portion of the locator ring is adjustably received by the slot defined by and between the posts so as to allow the locator ring to be adjustable in the position thereof in a direction towards and away from the rear wall of the housing of the manipulator unit.

18. A system for detecting a fluid leak and closing a fluid valve in response thereto, the fluid valve having a handle that at least partially rotates, the fluid valve being situated in line with a fluid carrying pipe, the system comprising:
    a control unit, the control unit having an electronic circuit;
    a fluid leak sensor, the fluid leak sensor being electrically connected to the electronic circuit of the control unit; and
    a manipulator unit, the manipulator unit being operatively coupleable to the fluid valve;
    wherein the fluid leak sensor generates a fluid leak detection signal when the fluid leak sensor detects a fluid leak;
    wherein the electronic circuit of the control unit is responsive to the fluid leak detection signal and generates a control signal in response thereto;
    wherein the manipulator unit is responsive to the control signal generated by the electronic circuit and causes the fluid valve to close in response thereto when the manipulator unit is operatively coupled to the fluid valve;
    wherein the manipulator unit is mechanically coupled to the handle of the fluid valve, the manipulator unit causing the handle of the fluid valve to at least partially rotate thereby causing the fluid valve to close, in response to the control signal generated by the electronic circuit of the control unit;
    wherein the manipulator unit includes:
        a housing, the housing defining an interior cavity;
        a motor situated within the manipulator unit housing, the motor having a motor shaft which rotates, the motor being energizable to cause the motor shaft to rotate in a clockwise direction and a counterclockwise direction;
        gearing operatively coupled to the motor shaft; and
        a lever arm, the lever arm being operatively coupled to the gearing;
    wherein the motor, when energized, causes the gearing to cause the lever arm to move between a first position and a second position;
    wherein, movement of the lever arm from the first position to the second position causes the handle of the fluid valve to at least partially rotate to cause the fluid valve to close;
    wherein the lever arm is an elongated member having a first axial end and a second axial end situated opposite the first axial end;
    wherein the first axial end of the lever arm is operatively coupled to the gearing;
    wherein the second axial end of the lever arm is operatively coupleable to the handle of the fluid valve;
    wherein the lever arm includes a pair of spaced apart pins mounted on the second axial end thereof, the spaced apart pins defining a space therebetween;
    wherein at least a portion of the handle of the fluid valve is receivable within the space defined by the spaced apart pins;
    wherein at least one pin of the pair of pins is adjustably mounted on the second axial end of the lever arm to adjust the width of the space defined by and between the pair of pins between which the at least portion of the handle of the fluid valve is receivable;
    wherein the at least one pin is adjustably mounted in a slot formed in the lever arm, the at least one pin being adjustable in its position within the slot so that the width of the space between the pair of pins is adjustable and so that the pair of pins may closely engage and receive between them the at least portion of the handle of the fluid valve; and
    wherein the manipulator unit includes spaced apart first and second mounting brackets, the first and second mounting brackets being operatively coupled to the housing of the manipulator unit, the first and second mounting brackets being affixable to the fluid carrying pipe to operatively couple the manipulator unit to the fluid valve and in alignment therewith.

19. A system for detecting a fluid leak as defined by claim 18, wherein each of the first and second mounting brackets includes a first leg and a second leg, each of the first leg and the second leg defining an outwardly extending portion, the fluid carrying pipe being receivable between the outwardly extending portions of the first and second legs of each of the first and second mounting brackets.

20. A system for detecting a fluid leak as defined by claim 19, wherein each of the first and second legs of the first and second mounting brackets has an axial end, the axial ends of the first and second legs of the first mounting bracket being pivotally joined together, the first and second legs of the second mounting bracket being pivotally joined together.

21. A system for detecting a fluid leak as defined by claim 18, wherein the first and second mounting brackets are adjustably coupled to the housing of the manipulator unit.

22. A system for detecting a fluid leak as defined by claim 18, wherein the spaced apart first and second mounting brackets define a space therebetween; and
    wherein the first and second mounting brackets are adjustably coupled to the housing of the manipulator unit to adjust the width of the space defined by and between the first and second mounting brackets.

23. A system for detecting a fluid leak as defined by claim 22, wherein the housing of the manipulator unit includes a rear wall;
    wherein the manipulator unit includes spaced apart first and second projection members, the first and second projection members being mounted on the rear wall of the housing and extending outwardly therefrom, each of the first and second projection members including a slot formed therein;
    wherein each of the first and second mounting brackets includes a flange, each flange having a slot formed therein;
    wherein the manipulator unit includes first and second bolts;
    wherein the flange of the first mounting bracket is adjustably mounted on the first projection member, the first bolt being receivable by the slot of the first projection member and the slot of the flange of the first mounting bracket; and
    wherein the flange of the second mounting bracket is adjustably mounted on the second projection member, the second bolt being receivable by the slot of the second projection member and the slot of the flange of the second mounting bracket.

24. A system for detecting a fluid leak as defined by claim 23, wherein each slot of the first projection member, the second projection member, the flange of the first mounting bracket and the flange of the second mounting bracket has an elongated length;
wherein the elongated length of the slot of the flange of the first mounting bracket is disposed perpendicularly to the elongated length of the slot of the first projection member; and
wherein the elongated length of the slot of the flange of the second mounting bracket is disposed perpendicularly to the elongated length of the slot of the second projection member.

25. A system for detecting a fluid leak as defined by claim 18, wherein the electronic circuit includes:
a microcontroller;
a power unit, the power unit providing power to the microcontroller and the manipulator unit;
an alarm transducer electrically connected to the microcontroller for emitting an audible alarm;
a first switch electrically connected to the microcontroller for disabling the alarm transducer from emitting the audible alarm;
a second switch electrically connected to the microcontroller and provided for at least one of testing and resetting the electronic circuit and system; and
at least one indicator light electrically connected to the microcontroller and illuminating to indicate a condition.

26. A system for detecting a water leak in one of at least one water conduit and an apparatus connected to the at least one water conduit, which comprises:
a control unit, the control unit having an electronic circuit;
a water sensor, the water sensor being electrically connected to the electronic circuit of the control unit; and
at least one ball valve and actuator unit, the at least one ball valve and actuator unit being in fluid communication with at least one source of water and the at least one water conduit, the at least one ball valve and actuator unit being changeable between a first state in which water is prevented from flowing therethrough and a second state in which water is permitted to flow therethrough;
wherein the water sensor generates a water leak detection signal when the water leak sensor detects a water leak;
wherein the electronic circuit of the control unit is responsive to the water leak detection signal and generates a control signal in response thereto;
wherein the at least one ball valve and actuator unit is responsive to the control signal generated by the electronic circuit and changes to the second state to prevent water from flowing therethrough and through the at least one water conduit connected thereto in response to the control signal;
wherein the water sensor includes an L-shaped housing having a first portion and a second portion situated perpendicularly to the first portion;
wherein electrical contacts extend outwardly from the second portion of the L-shaped housing of the water sensor; and
wherein the first portion of the L-shaped housing of the water sensor is mountable to a water pipe, the water pipe having an open end, the electrical contacts being positioned in alignment with the open end of the water pipe to detect the flow of water therefrom when the water sensor is mounted on the water pipe.

27. A system for detecting a water leak as defined by claim 26, wherein the control unit includes a housing, the housing defining an interior cavity in which the electronic circuit is situated; and
wherein the control unit includes an alarm transducer mounted on the housing and electrically connected to the electronic circuit, the alarm transducer emitting an audible alarm in response to a water leak being detected by the water leak sensor.

28. A system for detecting a water leak as defined by claim 27, wherein the control unit includes a first indicator light, the first indicator light being mounted on the housing of the control unit and being electrically connected to the electronic circuit of the control unit, the first indicator light being illuminated by the electronic circuit when at least one of a) a water leak is detected by the water leak sensor, and b) the at least one ball valve and actuator unit is in the first state in which water is prevented from flowing therethrough.

29. A system for detecting a water leak as defined by claim 28, wherein the control unit includes a second indicator light, the second indicator light being mounted on the housing of the control unit and being electrically connected to the electronic circuit of the control unit, the second indicator light being illuminated by the electronic circuit when at least one of c) a water leak is not detected by the water leak sensor, and d) the at least one ball valve and actuator unit is not in the first state.

30. A system for detecting a water leak as defined by claim 29, wherein the first indicator light illuminates in a red color; and
wherein the second indicator light illuminates in a green color.

31. A system for detecting a water leak as defined by claim 30, wherein the first indicator light and the second indicator light together are formed as a red/green bi-color light emitting diode (LED).

32. A system for detecting a water leak as defined by claim 29, wherein the control unit includes a third indicator light, the third indicator light being mounted on the housing of the control unit and being electrically connected to the electronic circuit of the control unit, the third indicator light being illuminated by the electronic circuit when at least one of e) the at least one ball valve and actuator unit is in the process of changing from the second state to the first state, f) a test is performed on the electronic circuit of the control unit, g) the electronic circuit disables the alarm transducer so that the alarm transducer does not emit an audible alarm, and h) power is restored to the electronic circuit after a loss of power.

33. A system for detecting a water leak as defined by claim 32, wherein the third indicator light illuminates in a yellow color.

34. A system for detecting a water leak as defined by claim 26, wherein the electronic circuit includes:
a microcontroller;
a power unit, the power unit providing power to the microcontroller and the at least one ball valve and actuator unit;
an alarm transducer electrically connected to the microcontroller for emitting an audible alarm;
a first switch electrically connected to the microcontroller for disabling the alarm transducer from emitting the audible alarm;

a second switch electrically connected to the microcontroller and provided for at least one of testing and resetting the electronic circuit and system; and at least one indicator light electrically connected to the microcontroller and illuminating to indicate a condition.

35. A system for detecting a fluid leak and closing a fluid valve in response thereto, which comprises:

a control unit, the control unit having an electronic circuit;

a fluid leak sensor, the fluid leak sensor being electrically connected to the electronic circuit of the control unit; and a manipulator unit, the manipulator unit being operatively coupleable to the fluid valve;

wherein the fluid leak sensor generates a fluid leak detection signal when the fluid leak sensor detects a fluid leak;

wherein the electronic circuit of the control unit is responsive to the fluid leak detection signal and generates a control signal in response thereto;

wherein the manipulator unit is responsive to the control signal generated by the electronic circuit and causes the fluid valve to close in response thereto when the manipulator unit is operatively coupled to the fluid valve;

wherein the fluid valve is a water valve;

wherein the fluid leak sensor is a water sensor;

wherein the water sensor includes an L-shaped housing having a first portion and a second portion situated perpendicularly to the first portion;

wherein the water sensor includes electrical contacts which extend outwardly from the second portion of the L-shaped housing of the water sensor; and wherein the first portion of the L-shaped housing of the water sensor is mountable to a water pipe, the water pipe having an open end, the electrical contacts being positioned in alignment with the open end of the water pipe to detect the flow of water therefrom when the water sensor is mounted on the water pipe.

* * * * *